(12) United States Patent
Kitsunai et al.

(10) Patent No.: US 9,933,941 B2
(45) Date of Patent: *Apr. 3, 2018

(54) MEMORY SYSTEM AND CONTROL METHOD THEREOF

(71) Applicant: Toshiba Memory Corporation, Minato-ku (JP)

(72) Inventors: Kazuya Kitsunai, Kawasaki (JP); Shinichi Kanno, Tokyo (JP); Hirokuni Yano, Tokyo (JP); Toshikatsu Hida, Kawasaki (JP); Junji Yano, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,939

(22) Filed: Sep. 20, 2016

(65) Prior Publication Data

US 2017/0010818 A1 Jan. 12, 2017

Related U.S. Application Data

(63) Continuation of application No. 14/923,128, filed on Oct. 26, 2015, now Pat. No. 9,483,192, which is a (Continued)

(30) Foreign Application Priority Data

Dec. 28, 2007 (JP) .................. 2007-339946

(51) Int. Cl.
*G06F 12/00* (2006.01)
*G06F 12/02* (2006.01)
*G06F 3/06* (2006.01)

(52) U.S. Cl.
CPC .......... *G06F 3/0604* (2013.01); *G06F 3/064* (2013.01); *G06F 3/0616* (2013.01);
(Continued)

(58) Field of Classification Search
CPC ......... G06F 12/0246; G06F 2212/1036; G06F 2212/7202; G06F 2212/7205;
(Continued)

(56) References Cited

U.S. PATENT DOCUMENTS 5,379,262 A 1/1995 Okamoto et al.
5,406,529 A 4/1995 Asano
(Continued)

FOREIGN PATENT DOCUMENTS

CN 1701308 A 11/2005
CN 101030166 A 9/2007
(Continued)

OTHER PUBLICATIONS

Combined Taiwanese Office Action and Search Report dated Dec. 27, 2012, in patent Application No. 097135364 with English translation.
(Continued)

*Primary Examiner* — Yong Choe
(74) *Attorney, Agent, or Firm* — Oblon, McClelland, Maier & Neustadt, L.L.P.

(57) ABSTRACT

A memory system includes a nonvolatile memory including a plurality of blocks as data erase units, a measuring unit which measures an erase time at which data of each block is erased, and a block controller which writes data supplied from at least an exterior into a first block which is set in a free state and whose erase time is oldest.

20 Claims, 25 Drawing Sheets

Related U.S. Application Data continuation of application No. 14/683,286, filed on Apr. 10, 2015, now Pat. No. 9,280,292, which is a continuation of application No. 14/455,680, filed on Aug. 8, 2014, now Pat. No. 9,026,724, which is a continuation of application No. 12/778,484, filed on May 12, 2010, now Pat. No. 8,886,868, which is a continuation of application No. 12/552,422, filed on Sep. 2, 2009, now Pat. No. 8,015,347, which is a continuation of application No. PCT/JP2008/066508, filed on Sep. 8, 2008.

(52) U.S. Cl.
CPC ........ *G06F 3/0619* (2013.01); *G06F 3/0647* (2013.01); *G06F 3/0652* (2013.01); *G06F 3/0659* (2013.01); *G06F 3/0679* (2013.01); *G06F 3/0685* (2013.01); *G06F 12/0246* (2013.01); *G06F 2212/1036* (2013.01); *G06F 2212/7202* (2013.01); *G06F 2212/7205* (2013.01); *G06F 2212/7211* (2013.01)

(58) Field of Classification Search
CPC ........ G06F 2212/7211; G06F 3/0604; G06F 3/0616; G06F 3/0619; G06F 3/064; G06F 3/0647; G06F 3/0652; G06F 3/0659; G06F 3/0679
See application file for complete search history.

(56) References Cited

U.S. PATENT DOCUMENTS

| | | | |
|---|---|---|---|
| 5,457,658 | A | 10/1995 | Niijima et al. |
| 5,485,595 | A | 1/1996 | Assar et al. |
| 5,737,742 | A | 4/1998 | Achiwa et al. |
| 6,091,643 | A | 7/2000 | Kawakami |
| 6,725,322 | B1 | 4/2004 | Shiraishi et al. |
| 7,035,993 | B2 | 4/2006 | Tai et al. |
| 7,496,811 | B2 | 2/2009 | Kanno |
| 7,590,919 | B2 | 9/2009 | Kanno |
| 7,796,429 | B2 | 9/2010 | Kanno et al. |
| 7,900,117 | B2 | 3/2011 | Kanno |
| 7,904,640 | B2 | 3/2011 | Yano et al. |
| 8,117,517 | B2 | 2/2012 | Kanno et al. |
| 8,156,393 | B2 | 4/2012 | Nagadomi et al. |
| 8,171,208 | B2 | 5/2012 | Yano et al. |
| 8,209,471 | B2 | 6/2012 | Yano et al. |
| 8,327,065 | B2 | 12/2012 | Yano et al. |
| 8,352,706 | B2 | 1/2013 | Yano et al. |
| 8,447,914 | B2 | 5/2013 | Yano et al. |
| 8,527,727 | B2 | 9/2013 | Ootsuka et al. |
| 8,527,733 | B2 | 9/2013 | Norimatsu et al. |
| 8,553,467 | B2 | 10/2013 | Shimura et al. |
| 8,554,984 | B2 | 10/2013 | Yano et al. |
| 8,745,443 | B2 | 6/2014 | Hiro et al. |
| 2003/0135688 | A1 | 7/2003 | Tai et al. |
| 2004/0104422 | A1 | 6/2004 | Arai et al. |
| 2007/0033332 | A1 | 2/2007 | Sinclair et al. |
| 2007/0075686 | A1 | 4/2007 | Togashi et al. |
| 2007/0124533 | A1 | 5/2007 | Estakhri et al. |
| 2007/0130496 | A1 | 7/2007 | Kanno |
| 2008/0205145 | A1 | 8/2008 | Kanno et al. |
| 2009/0091978 | A1* | 4/2009 | Yeh ................. G06F 12/0246 365/185.09 |
| 2009/0177944 | A1 | 7/2009 | Kanno |
| 2009/0183052 | A1 | 7/2009 | Kanno et al. |
| 2010/0011260 | A1 | 1/2010 | Nagadomi et al. |
| 2010/0064096 | A1 | 3/2010 | Weingarten et al. |
| 2010/0161885 | A1 | 6/2010 | Kanno et al. |
| 2010/0169549 | A1 | 7/2010 | Yano et al. |
| 2010/0281204 | A1 | 11/2010 | Yano et al. |
| 2011/0307667 | A1 | 12/2011 | Yano et al. |
| 2012/0159051 | A1 | 6/2012 | Hida et al. |
| 2013/0227246 | A1 | 8/2013 | Hirao et al. |
| 2013/0232296 | A1 | 9/2013 | Yonezawa et al. |

FOREIGN PATENT DOCUMENTS

| | | |
|---|---|---|
| CN | 101046771 A | 10/2007 |
| JP | 6-70119 | 3/1994 |
| JP | 6-250798 | 9/1994 |
| JP | 7-122083 | 5/1995 |
| JP | 8-16482 | 1/1996 |
| JP | 8-124393 | 5/1996 |
| JP | 8-273390 | 10/1996 |
| JP | 11-96779 | 4/1999 |
| JP | 2007-58966 A | 3/2007 |
| TW | 200641900 A | 12/2006 |
| TW | 200917261 A | 4/2009 |

OTHER PUBLICATIONS

Hennessy et al., "Computer Organization and Design—The Hardware/Software Interface," Chapter 7: Large and Fast: Exploiting Memory Hierarchy, pp. 540, 541.2nd Ed. Morgan Kaufmann Pub. Aug. 31, 2004.

Mielke et al., "Flash EEPROM Threshold Instabilities due to Charge Trapping During Program/Erase Cycling," IEEE Transactions on Device and Materials Reliability, vol. 4, No. 3, Sep. 2004, pp. 335-344.

Mielke et al., "Recovery Effects in the Distributed Cycling of Flash Memories," IEEE 06CH37728 44th Annual International Reliability Physics Symposium, San Jose 2006, pp. 29-35.

European Search Report dated Sep. 5, 2011, in Patent Application No. 08867572.3.

Combined Chinese Office Action and Search Report dated Jul. 29, 2015 in Patent Application No. 200880006535.2 (with English letter from Zhongzi Law Office and English translation of categories of cited documents).

Combined Office Action and Search Report dated Mar. 29, 2017, in Chinese Patent Application No. 201510043409.6.

\* cited by examiner

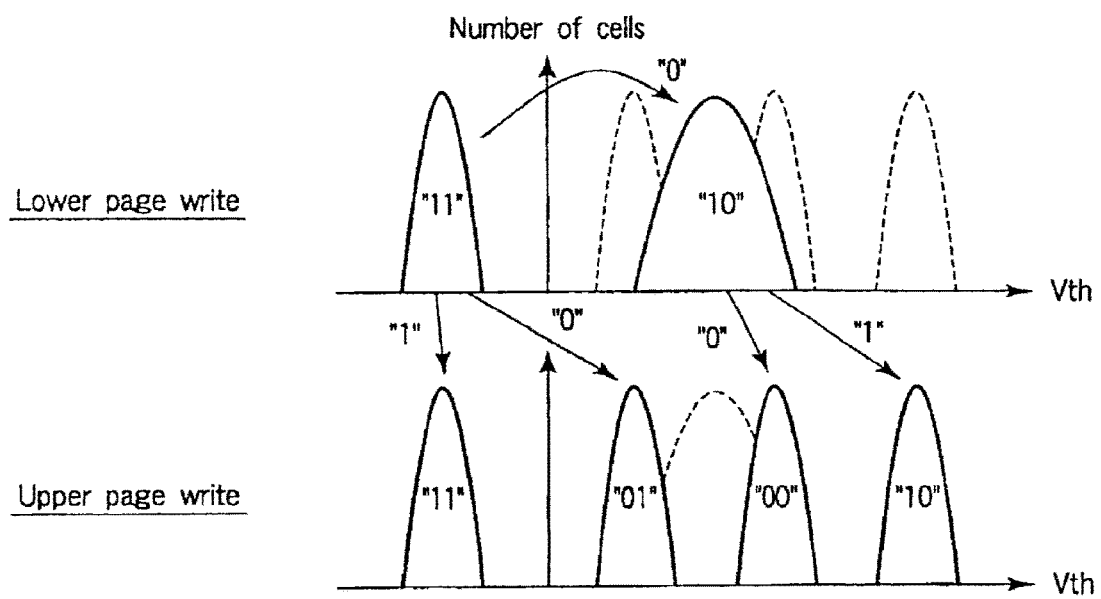
F I G. 3B

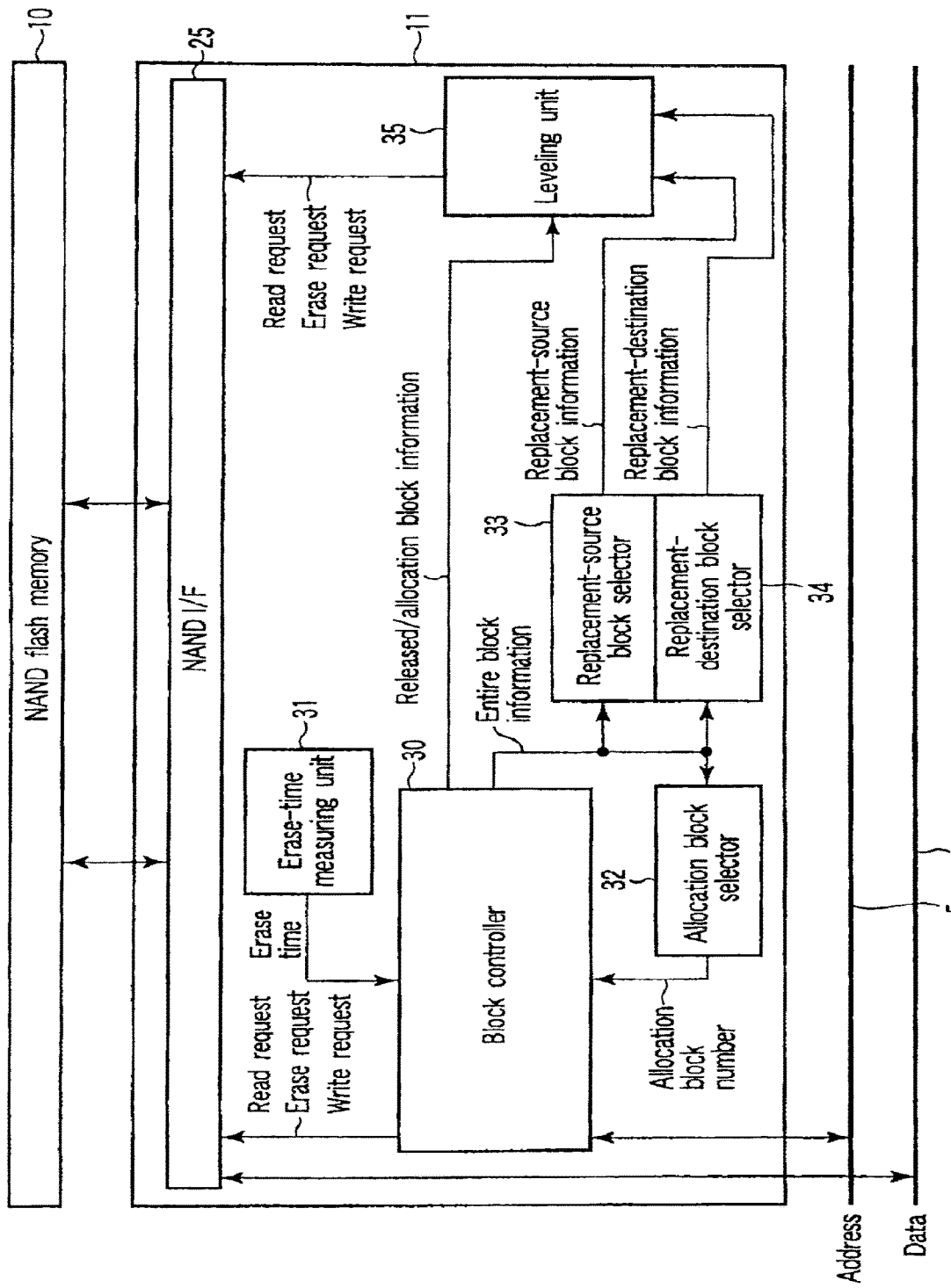
F I G. 4

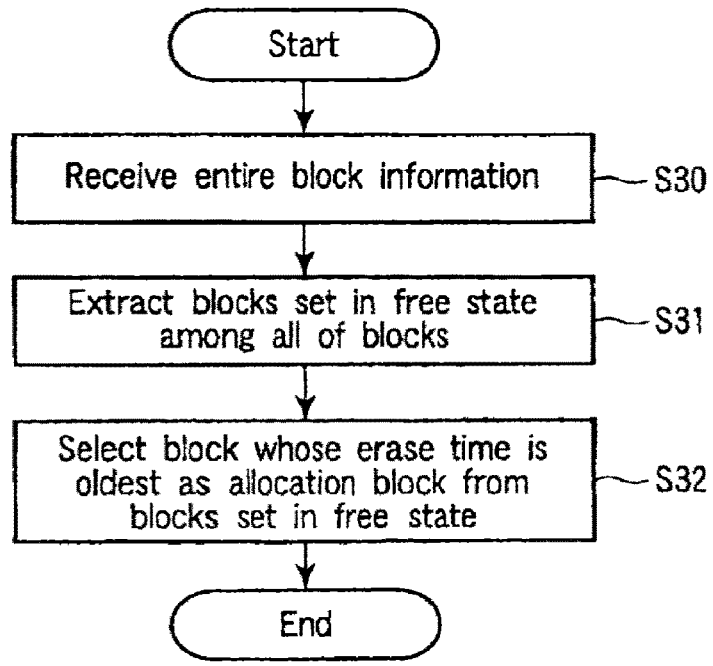
F I G. 9
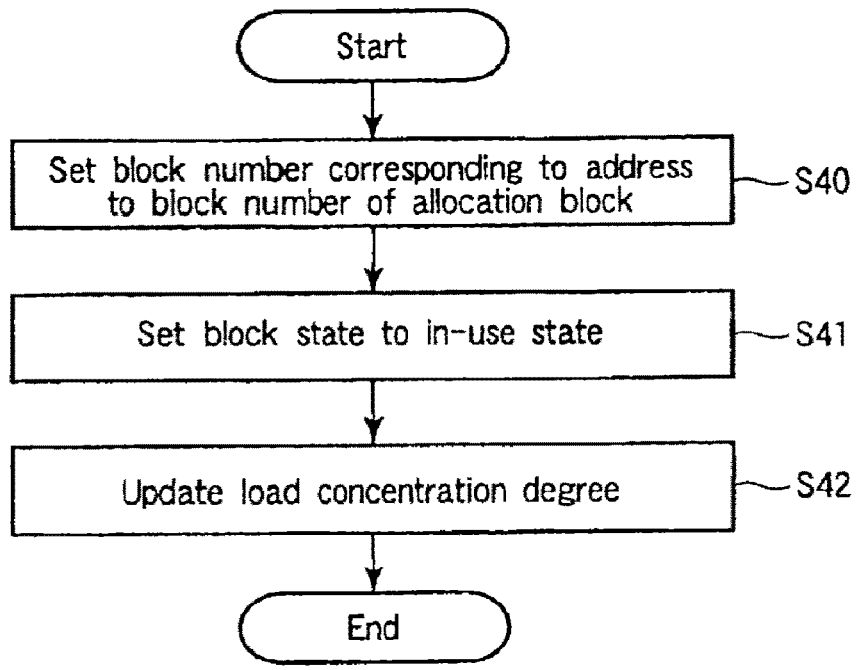
F I G. 10

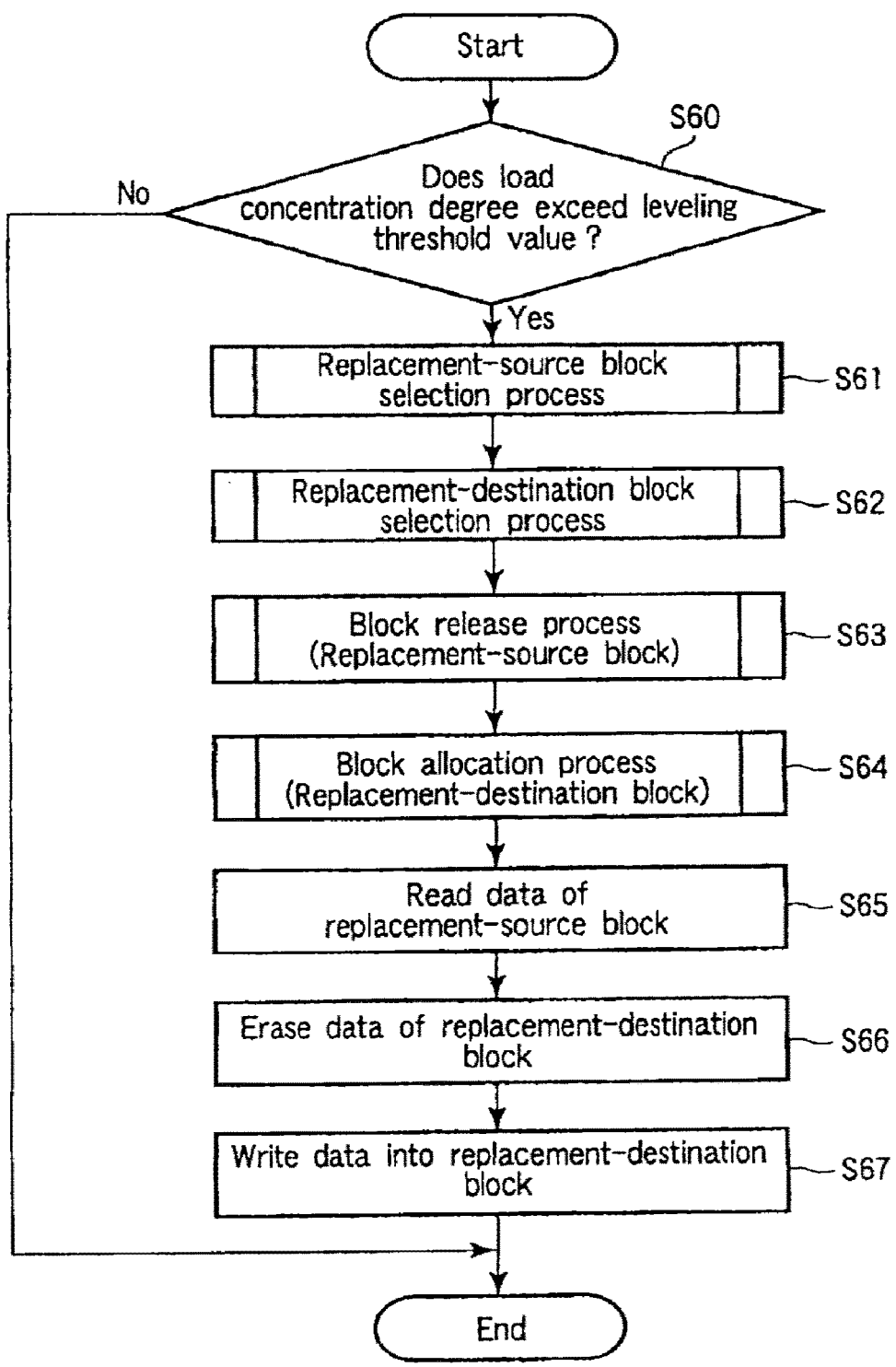
F I G. 13

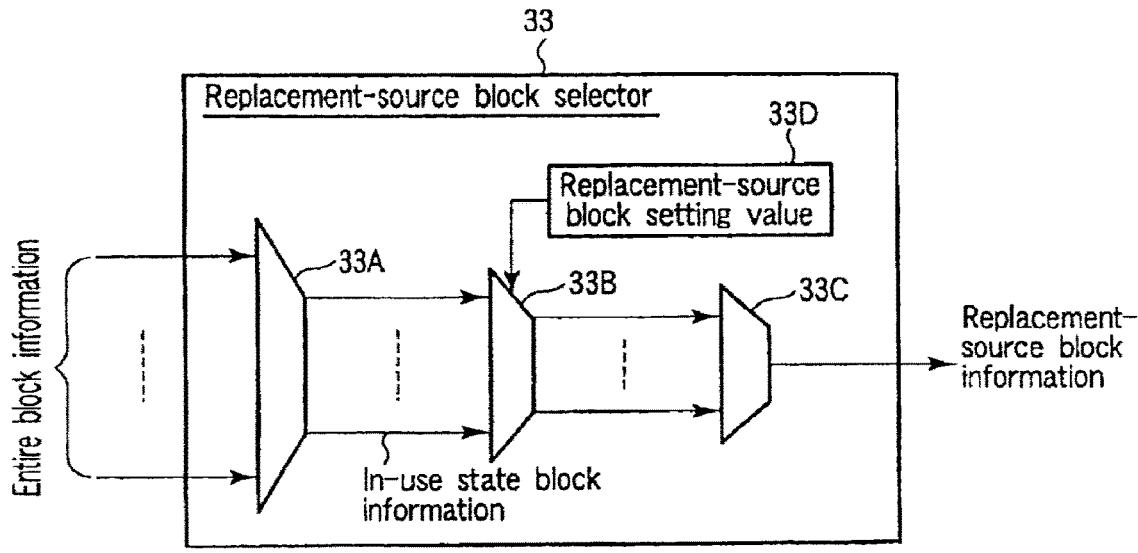
F I G. 14
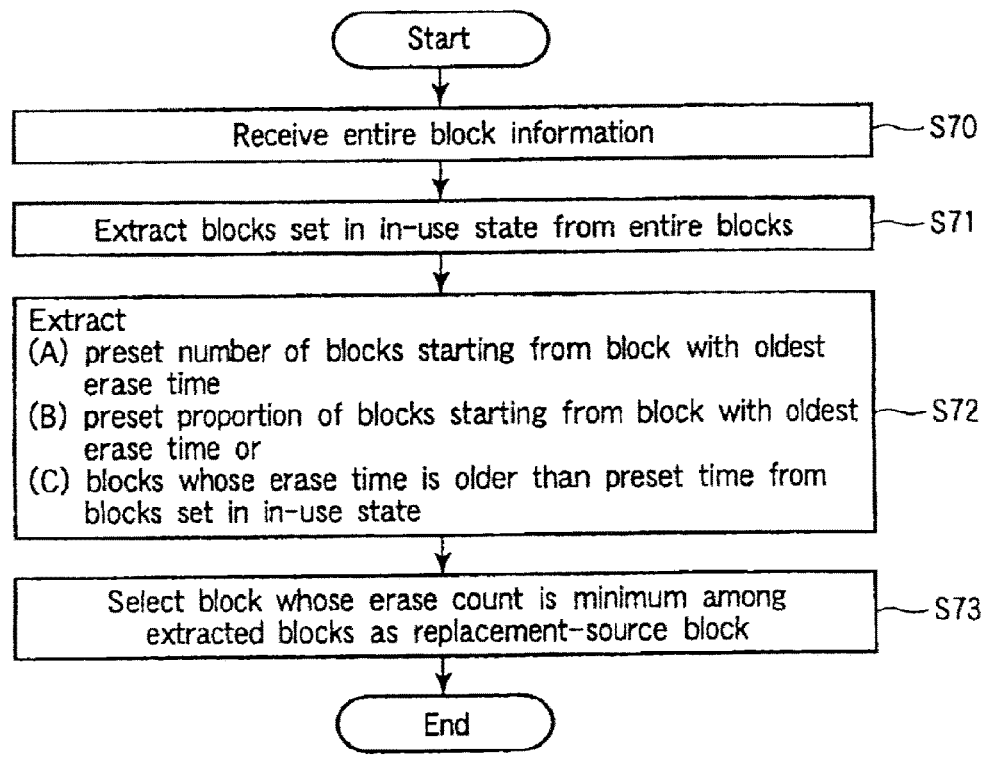
F I G. 15

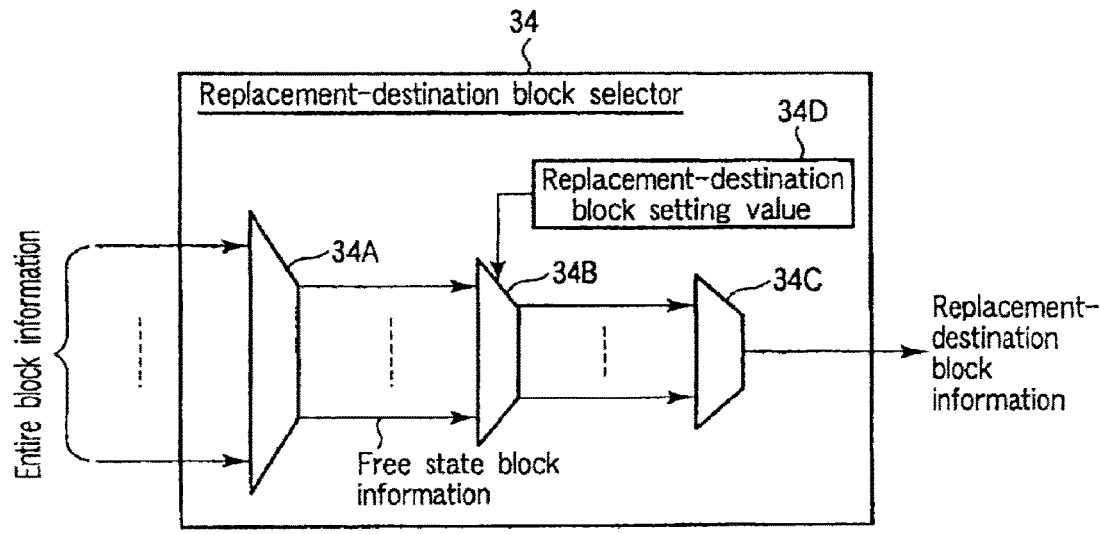
F I G. 16
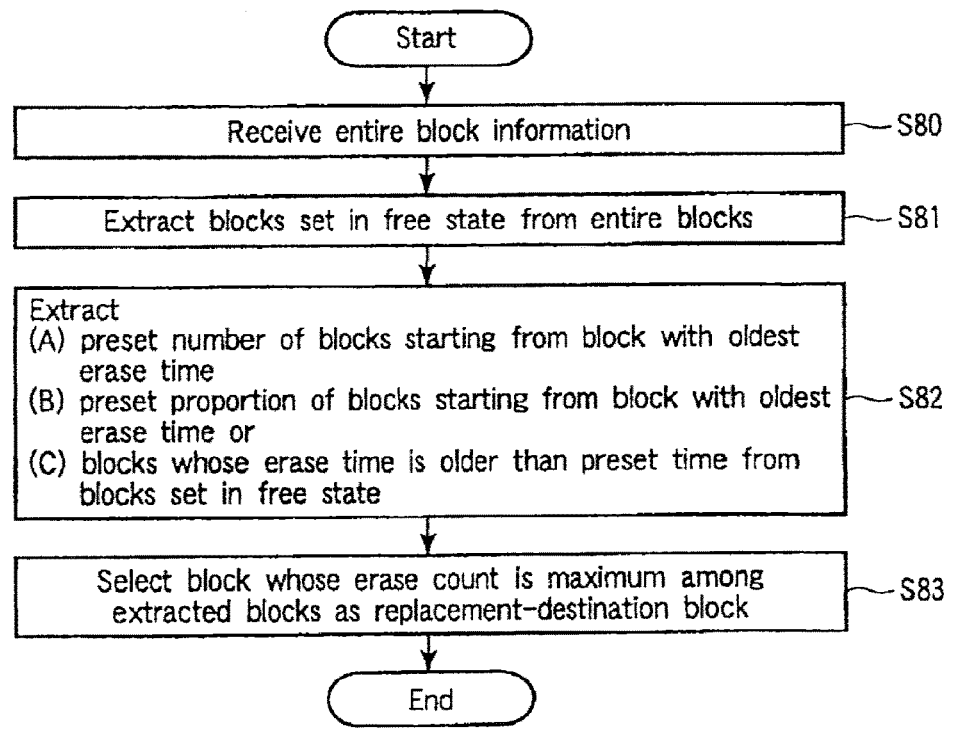
F I G. 17

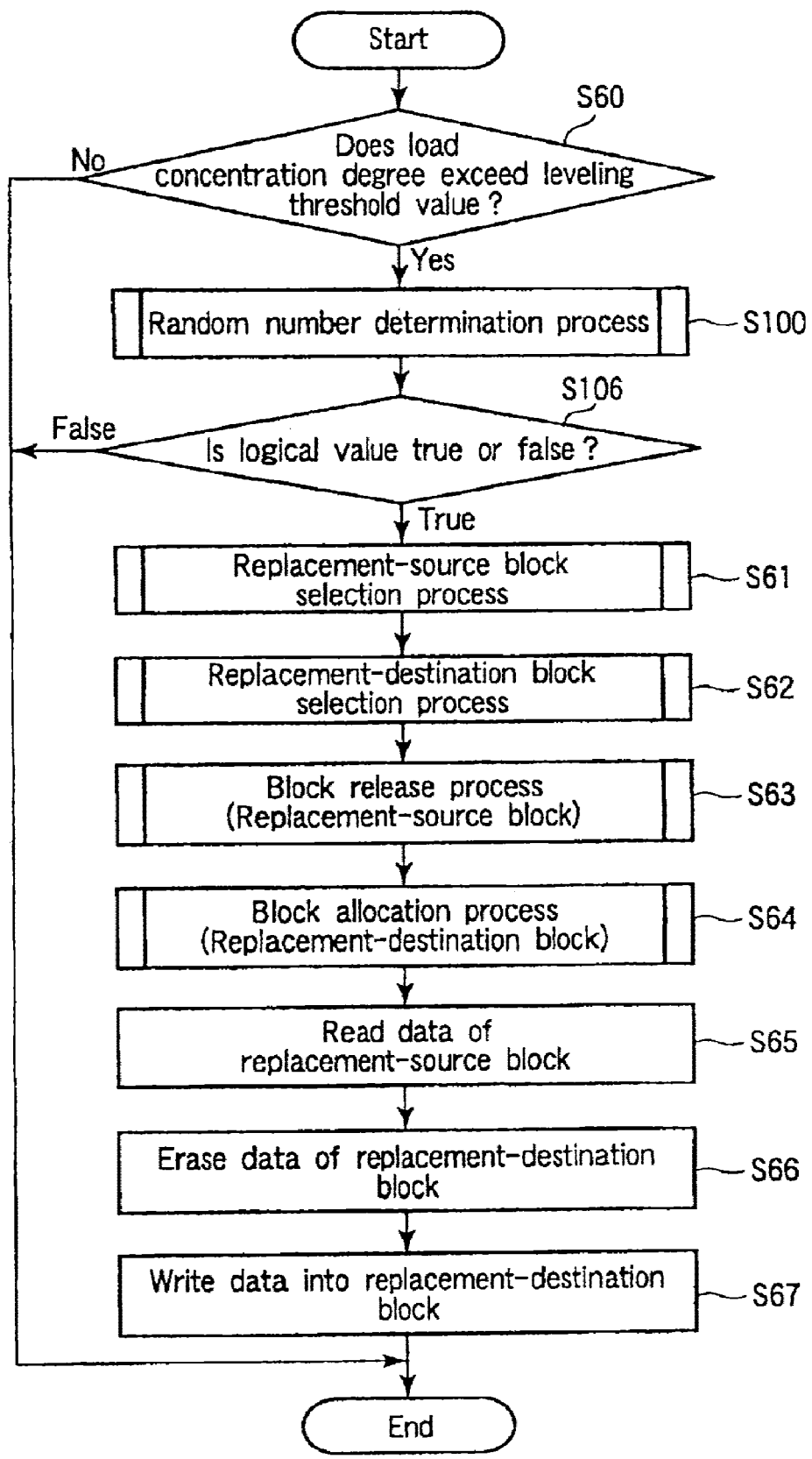
F I G. 22

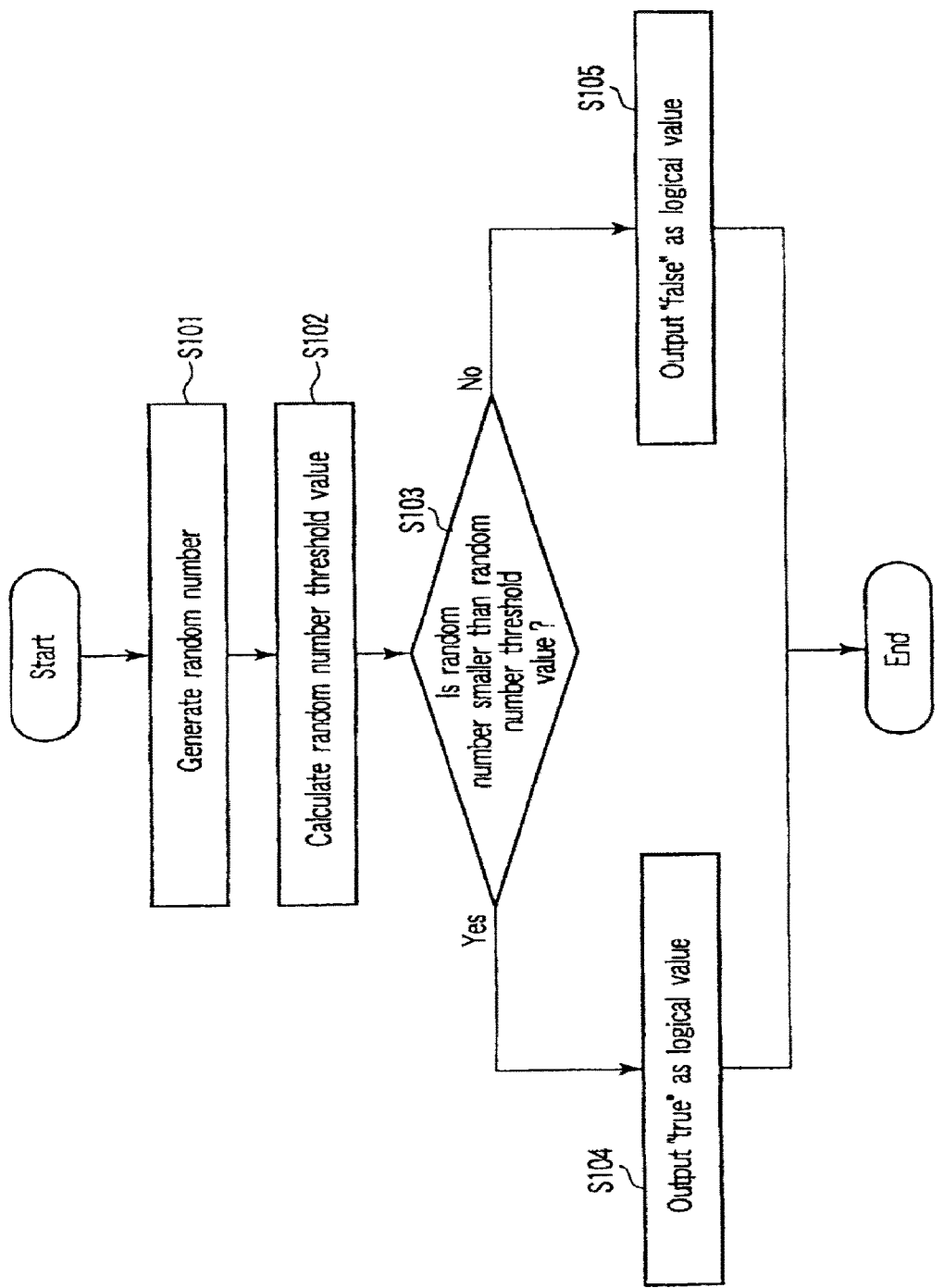
F I G. 23

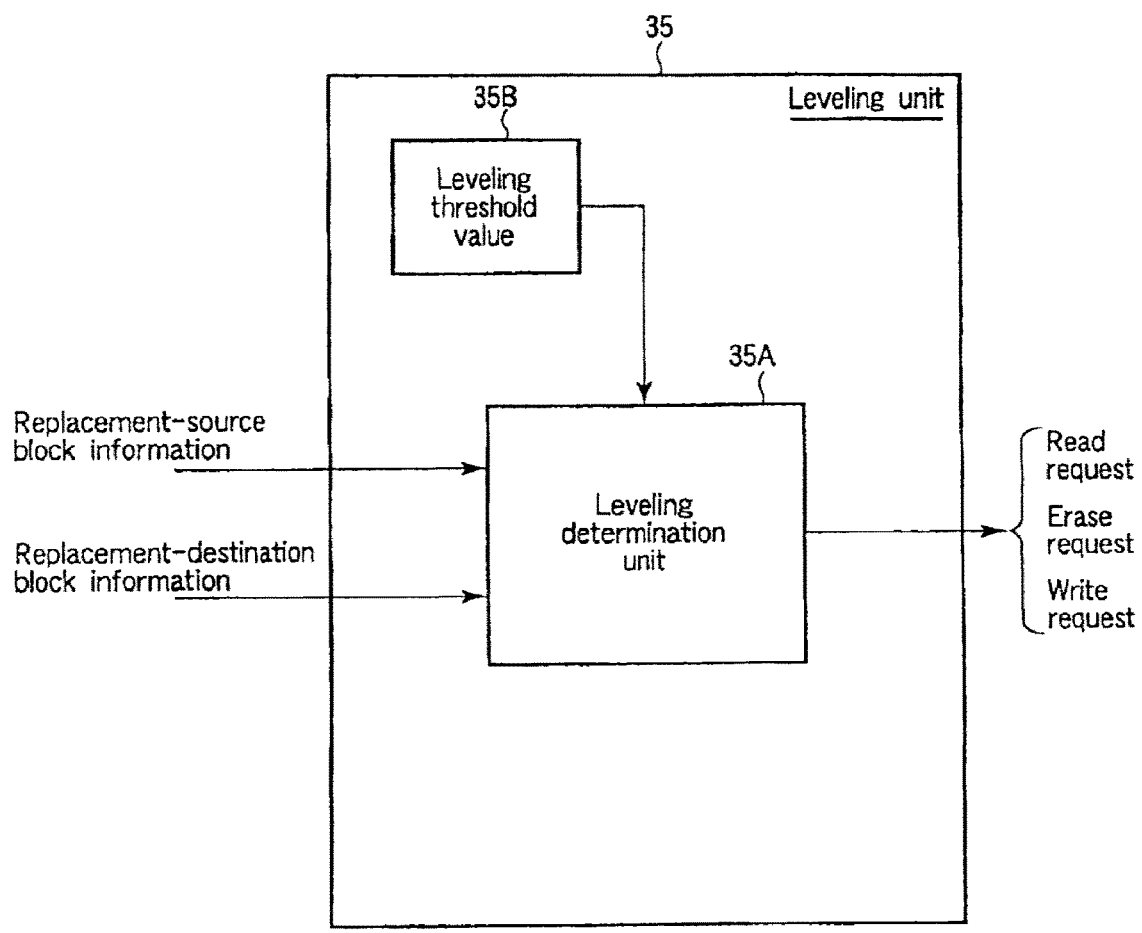
F I G. 25

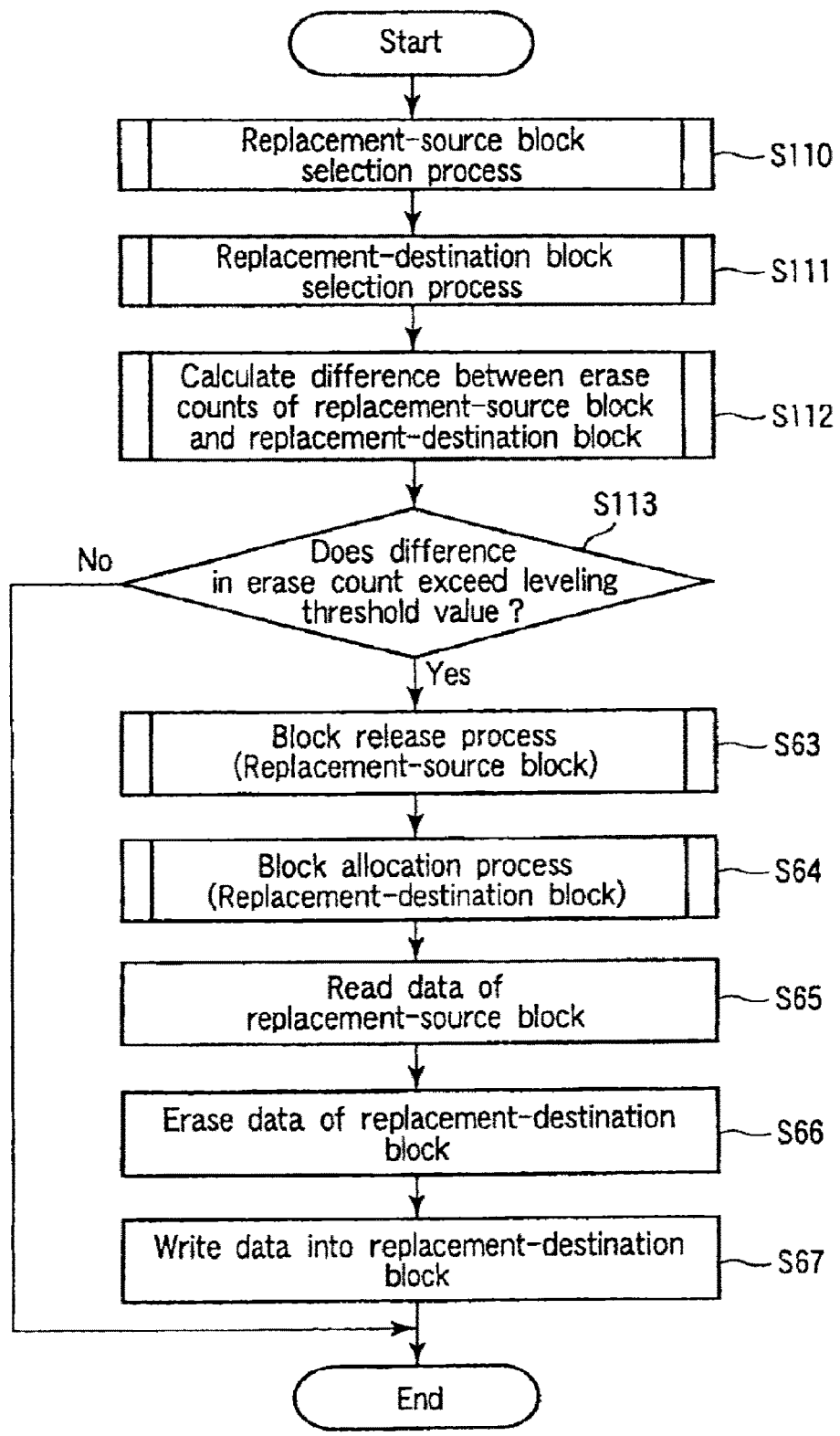
F I G. 26

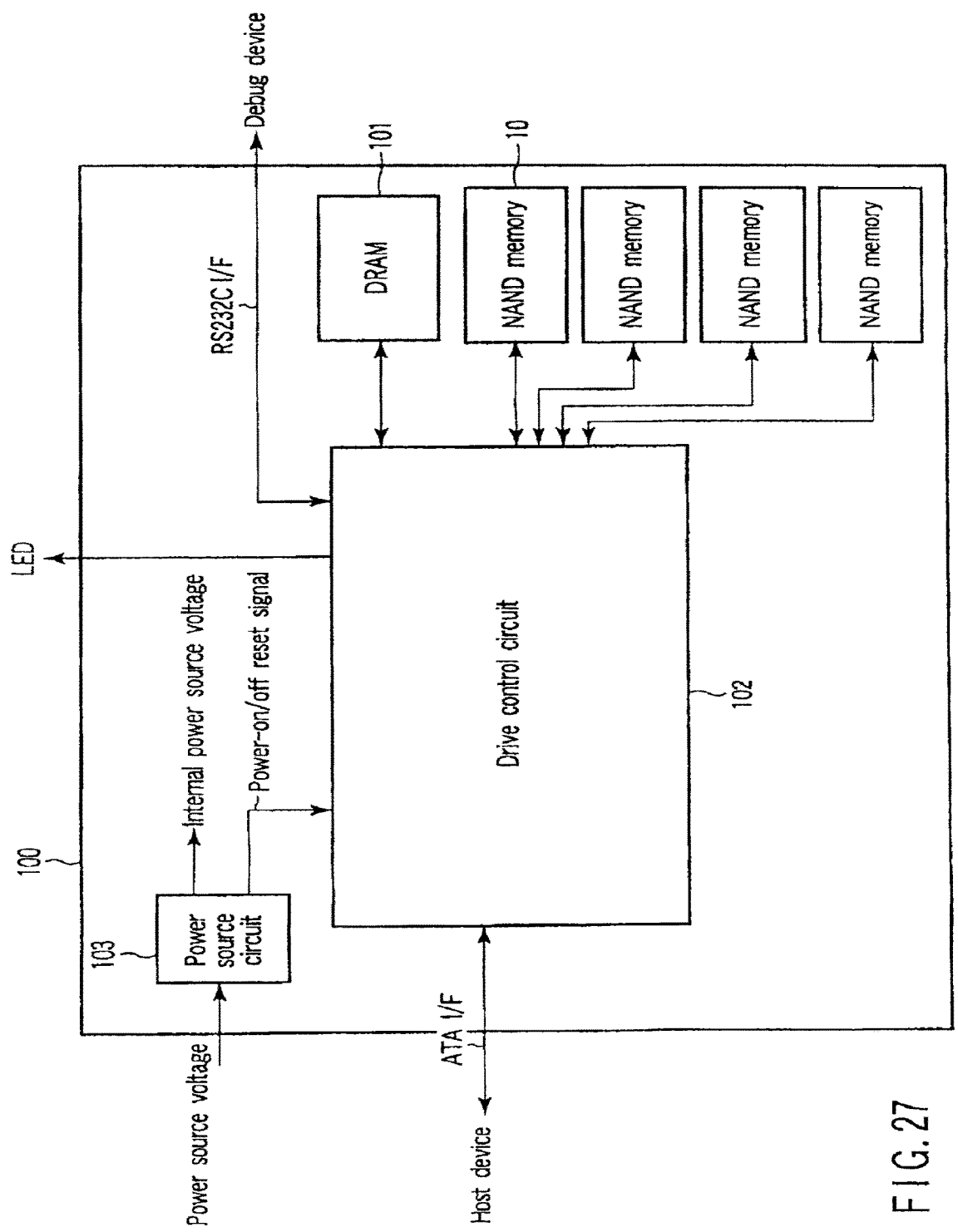
F I G. 27

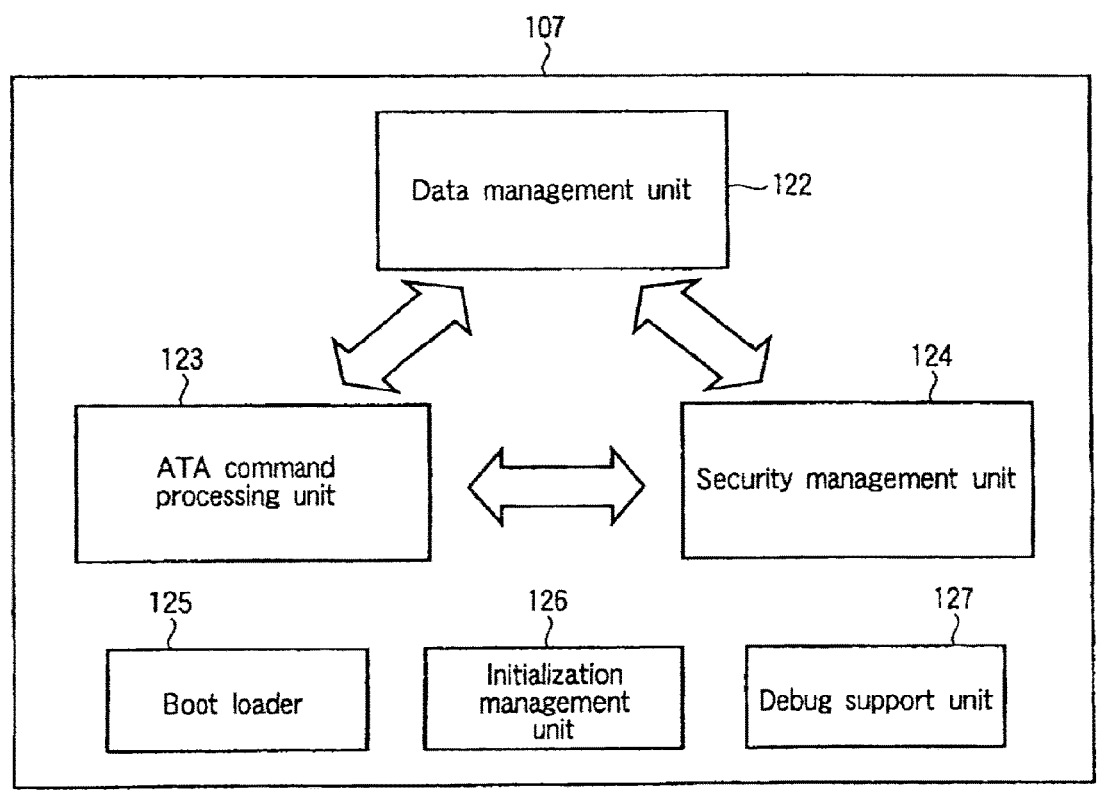
F I G. 29

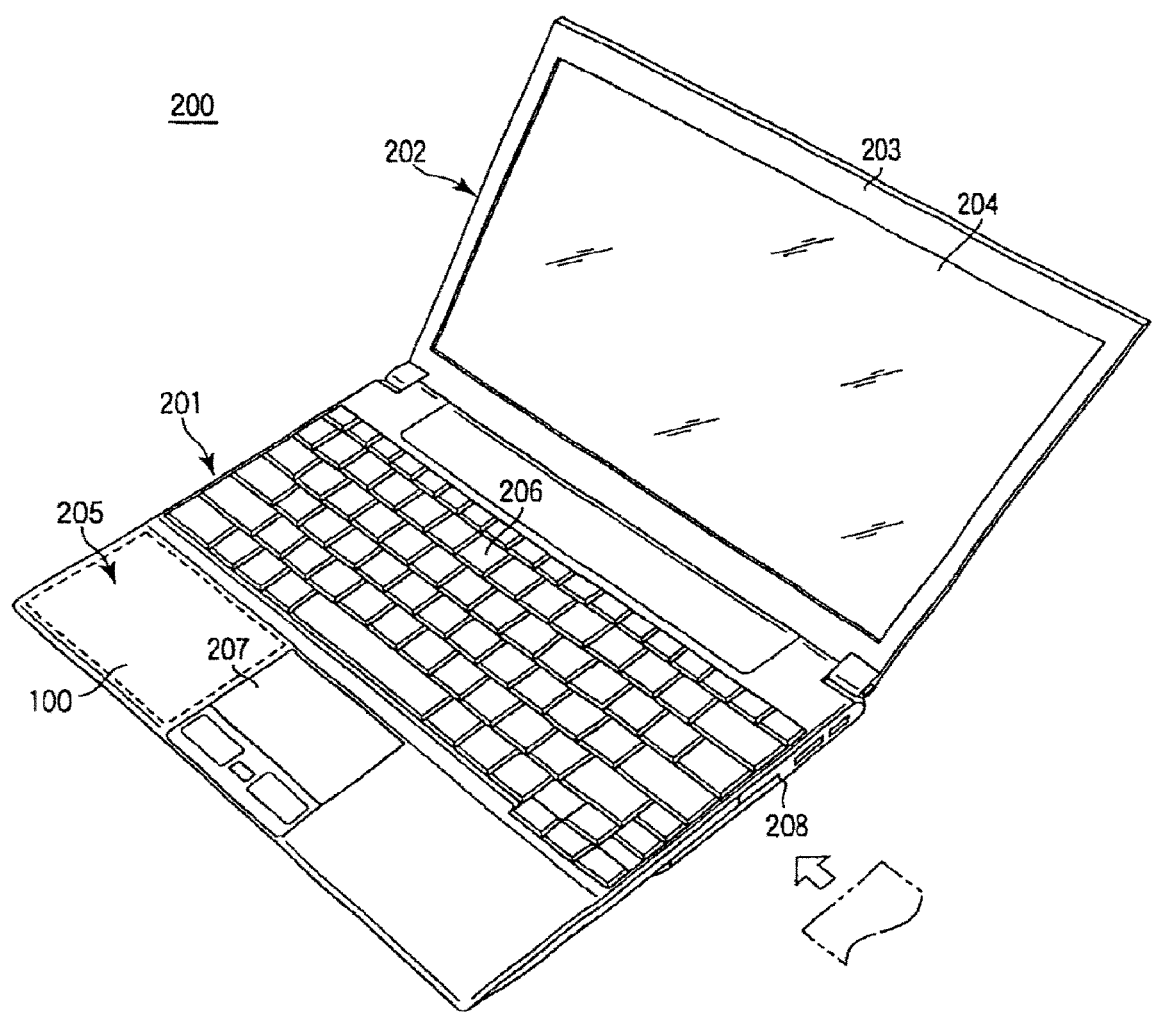
F I G. 30

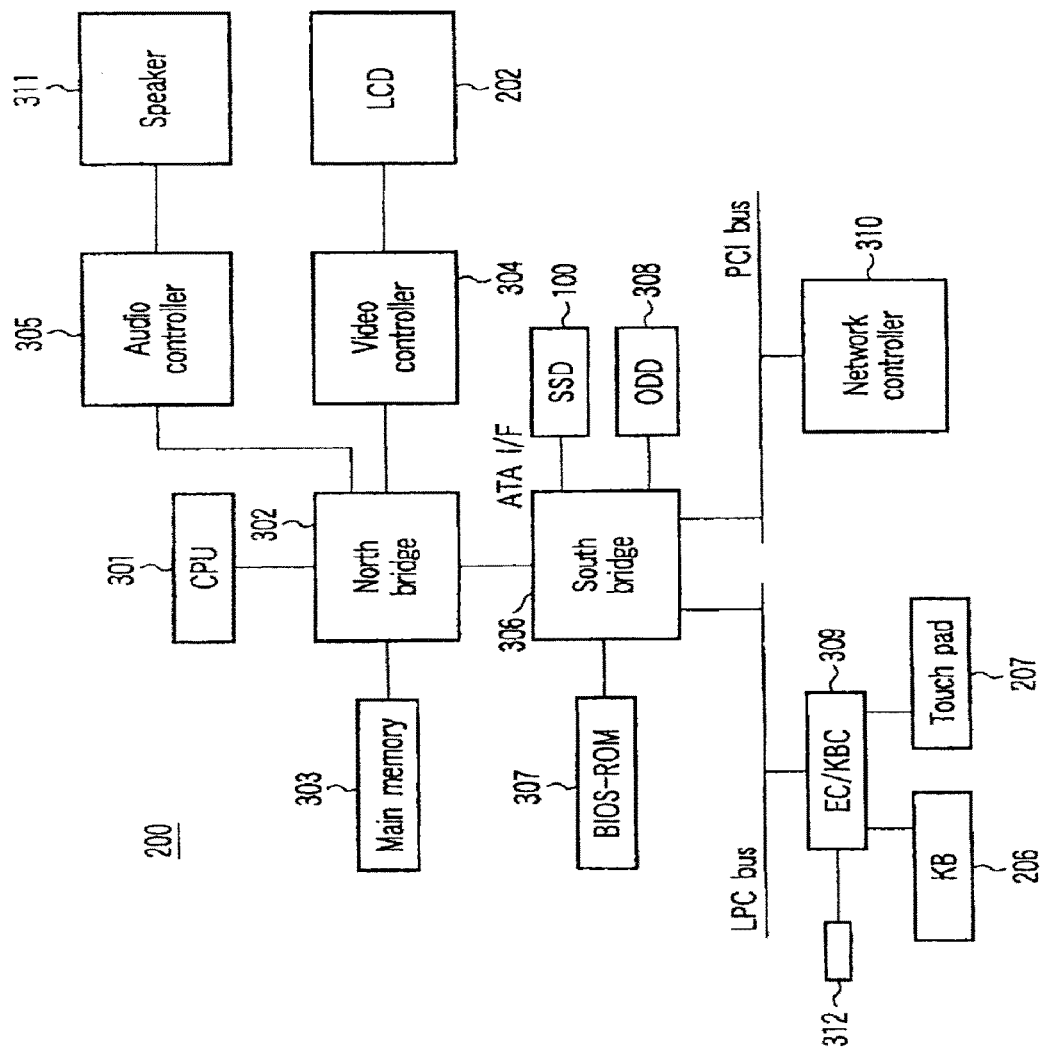
F I G. 31

MEMORY SYSTEM AND CONTROL METHOD THEREOF

CROSS-REFERENCE TO RELATED APPLICATIONS

This application is a continuation of and claims the benefit of priority under 35 U.S.C. § 120 from U.S. Ser. No. 14/923,128, filed Oct. 26, 2015 which is a continuation of U.S. Ser. No. 14/683,286, filed Apr. 10, 2015, now U.S. Pat. No. 9,280,292, which is a continuation of U.S. Ser. No. 14/455,680, filed Aug. 8, 2014, now U.S. Pat. No. 9,026,724, which is a continuation of U.S. Ser. No. 12/778,484, filed May 12, 2010, now U.S. Pat. No. 8,886,868, which is a continuation of U.S. Ser. No. 12/552,422, filed Sep. 2, 2009, now U.S. Pat. No. 8,015,347, which is a continuation of PCT Application No. PCT/JP2008/066508, filed Sep. 8, 2008, (which was published under PCT Article 21(2) in English), the entire contents of each of which are incorporated by reference.

This application is based upon and claims the benefit of priority from prior Japanese Patent Application No. 2007-339946, filed Dec. 28, 2007, the entire contents of which are incorporated herein by reference.

BACKGROUND OF THE INVENTION

1. Field of the Invention

This invention relates to a memory system and a control method thereof, and, for example, a memory system having a NAND flash memory.

2. Description of the Related Art

Recently, nonvolatile semiconductor memories are used in various portions such as large-scale computers, personal computers, home electrical appliances, portable telephones and the like. Particularly, NAND flash memories are nonvolatile semiconductor memories that are electrically rewritable and can be formed with large capacity and high integration density. Further, recently, it is considered to use the NAND flash memory instead of a hard disc drive (HDD).

The NAND flash memory is a semiconductor memory that requires an erase process before a write process is performed. The service life thereof depends on the number of rewrite operations. The data write/erase operation in the NAND flash memory is to inject/discharge electrons with respect to the floating gate by applying high voltage between the substrate and the control gate. If the above operation is performed by a large number of times, the gate oxide film lying around the floating gate is degraded and electrons injected into the floating gate are extracted to destroy data. That is, when the number of rewrite operations is increased, a period in which data is kept retained after data was written becomes short (the retention characteristic is degraded).

Further, data recorded by use of personal computers and the like has both of time locality and regional locality (Document 1: David A. Patterson and John L. Hennessy, "Computer Organization and Design: The hardware/Software Interface", Morgan Kaufmann Pub, 2004 August 31). Therefore, if data items are sequentially recorded as they are in addresses specified from the exterior when data is recorded, the rewrite processes, that is, erase processes are concentrated in a specified region in a short period and thus the number of erase processes becomes largely unbalanced.

It is known that the service life of the NAND flash memory also depends on the interval between the erase processes and the retention characteristic becomes better and the service life becomes longer as the interval becomes longer (Document 2: Neal Mielke et al., "Flash EEPROM Threshold Instabilities due to Charge Trapping During Program/Erase Cycling", IEEE TRANSACTIONS ON DEVICE AND MATERIALS RELIABILITY, VOL. 4, NO. 3, SEPTEMBER 2004, PP. 335-344). This also indicates that the retention characteristic becomes degrading and the service life becomes shorter as the erase interval becomes shorter.

Further, it is known that the retention characteristic is recovered even when the write operations are performed at short intervals unless an erase process is performed for a corresponding long period (Document 3: Neal Mielke et al., "Recovery Effects in the Distributed Cycling of Flash Memories", 44th Annual International Reliability Physics Symposium, San Jose, 2006, PP. 29-35).

BRIEF SUMMARY OF THE INVENTION

According to an aspect of the present invention, there is provided a memory system comprising: a nonvolatile memory including a plurality of blocks as data erase units; a measuring unit which measures an erase time at which data of each block is erased; and a block controller which writes data supplied from at least an exterior into a first block which is set in a free state and whose erase time is oldest.

According to an aspect of the present invention, there is provided a memory system comprising: a nonvolatile memory including a plurality of blocks as data erase units; a measuring unit which measures an erase time at which data of each block is erased; a block controller which counts an erase count of each block, and has a block table indicating a correspondence relation between a status value indicating one of a free state and an in-use state, the erase time and the erase count for each block; and a first selector which selects a first block whose an erase count is minimum among a preset number of blocks set in the free state starting from a block whose an erase time is oldest based on information of the block table, wherein the block controller writes data supplied from at least an exterior into the first block.

According to an aspect of the present invention, there is provided a memory system comprising: a nonvolatile memory including a plurality of blocks as data erase units; a measuring unit which measures an erase time at which data of each block is erased; a block controller which counts an erase count of each block, and has a block table indicating a correspondence relation between a status value indicating one of a free state and an in-use state, the erase time and the erase count for each block; and a first selector which selects a first block whose an erase count is minimum among a preset ratio of blocks set in the free state starting from a block whose an erase time is oldest based on information of the block table, wherein the block controller writes data supplied from at least an exterior into the first block.

According to an aspect of the present invention, there is provided a memory system comprising: a nonvolatile memory including a plurality of blocks as data erase units; a measuring unit which measures an erase time at which data of each block is erased; a block controller which counts an erase count of each block, and has a block table indicating a correspondence relation between a status value indicating one of a free state and an in-use state, the erase time and the erase count for each block; and a first selector which selects a first block whose an erase count is minimum among blocks which are set in the free state and whose erase times are older than a preset time based on information of the block table, wherein the block controller writes data supplied from at least an exterior into the first block.

According to an aspect of the present invention, there is provided a control method of a memory system including a nonvolatile memory having a plurality of blocks as data erase units, the method comprising: measuring an erase time at which data of each block is erased; and writing data supplied from at least an exterior into a first block which is set in a free state and whose erase time is oldest.

According to an aspect of the present invention, there is provided a control method of a memory system including a nonvolatile memory having a plurality of blocks as data erase units, the method comprising: measuring an erase time at which data of each block is erased; counting an erase count of each block; generating a block table indicating a correspondence relation between a status value indicating one of a free state and an in-use state, the erase time and the erase count for each block; selecting a first block whose an erase count is minimum among a preset number of blocks set in the free state starting from a block whose an erase time is oldest based on information of the block table; and writing data supplied from at least an exterior into the first block.

According to an aspect of the present invention, there is provided a control method of a memory system including a nonvolatile memory having a plurality of blocks as data erase units, the method comprising: measuring an erase time at which data of each block is erased; counting an erase count of each block; generating a block table indicating a correspondence relation between a status value indicating one of a free state and an in-use state, the erase time and the erase count for each block; selecting a first block whose an erase count is minimum among a preset ratio of blocks set in the free state starting from a block whose an erase time is oldest based on information of the block table; and writing data supplied from at least an exterior into the first block.

According to an aspect of the present invention, there is provided a control method of a memory system including a nonvolatile memory having a plurality of blocks as data erase units, the method comprising: measuring an erase time at which data of each block is erased; counting an erase count of each block; generating a block table indicating a correspondence relation between a status value indicating one of a free state and an in-use state, the erase time and the erase count for each block; selecting a first block whose an erase count is minimum among blocks which are set in the free state and whose erase times are older than a preset time based on information of the block table; and writing data supplied from at least an exterior into the first block.

BRIEF DESCRIPTION OF THE SEVERAL VIEWS OF THE DRAWING

FIG. 3B is a view showing an example of a threshold distribution obtained in a four-level data recording system;

FIG. 4 is a block diagram for explaining one example of a NAND controller 11;

FIG. 9 is a flowchart for illustrating an allocation block selection process of the allocation block selector 32;

FIG. 10 is a flowchart for illustrating a block allocation process of the NAND controller 11;

FIG. 13 is a flowchart for illustrating a leveling process of the NAND controller 11;

FIG. 14 is a block diagram showing the configuration of a replacement-source block selector 33;

FIG. 15 is a flowchart for illustrating a replacement-source block selection process of the replacement-source block selector 33;

FIG. 16 is a block diagram showing the configuration of a replacement-destination block selector 34;

FIG. 17 is a flowchart for illustrating a replacement-destination block selection process of the replacement-destination block selector 34;

FIG. 22 is a flowchart for illustrating a leveling process of the NAND controller 11;

FIG. 23 is a flowchart for illustrating a random number determination process of the leveling limitation unit 37;

FIG. 25 is a block diagram showing the configuration of a leveling unit 35;

FIG. 26 is a flowchart for illustrating a leveling process of the NAND controller 11;

FIG. 27 is a block diagram showing the configuration of an SSD 100 according to an embodiment;

FIG. 29 is a block diagram showing the configuration of a processor 107;

FIG. 30 is a perspective view showing one example of a portable computer 200 having an SSD 100 mounted thereon; and FIG. 31 is a block diagram showing an example of a system configuration of a portable computer 200 using an SSD 100.

DETAILED DESCRIPTION OF THE INVENTION

There will now be described embodiments of the present invention with reference to the accompanying drawings. In the following explanation, elements having the same functions and configurations are denoted by the same symbols and the repetitive explanation is made only in required cases.

First Embodiment

Figure 1:
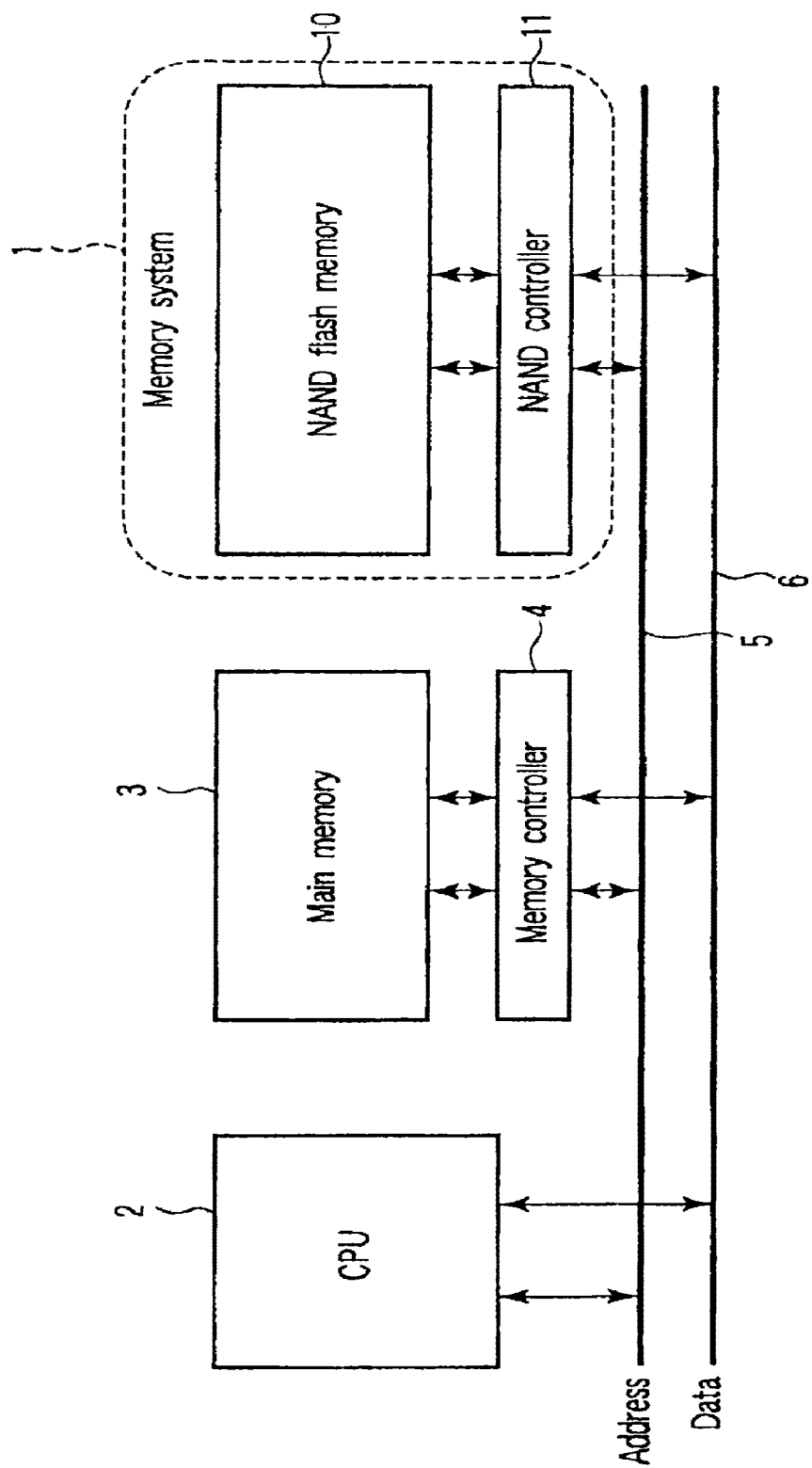
FIG. 1 is a schematic view showing an example of a computer system including a memory system 1 according to the first embodiment of the present invention.

A memory system of this embodiment is mounted on a printed circuit board having a host device mounted on it, and exchanges data with the host device via a bus. Alternatively, the memory system of this embodiment is designed to be detachably attached to a host device. This memory system is connected to the host device and exchanges data with the host device via a bus. FIG. 1 is a schematic view showing an example of a computer system including a memory system 1 of this embodiment.

The computer system comprises a central processing unit (CPU) 2, a main memory 3 such as a dynamic random access memory (DRAM), a memory controller 4 for controlling the main memory 3, and the memory system 1 of this embodiment. The CPU 2, main memory 3, and memory system 1 are connected to each other via an address bus 5 for handling addresses and a data bus 6 for handling data.

In this computer system, if a transfer request (read request or write request) from the CPU 2 is the write request, data (including externally input data) of the CPU 2 or data of the main memory 3 is transferred to the memory system 1. If the transfer request from the CPU 2 is the read request, data of the memory system 1 is transferred to the CPU 2 or main memory 3.

The memory system 1 comprises a NAND flash memory 10 as a kind of a nonvolatile semiconductor memory, and a NAND controller 11 for controlling the NAND flash memory 10. An example of the configuration of the memory system 1 will be explained below.

[1. Configuration of Memory System 1]

Figure 2:
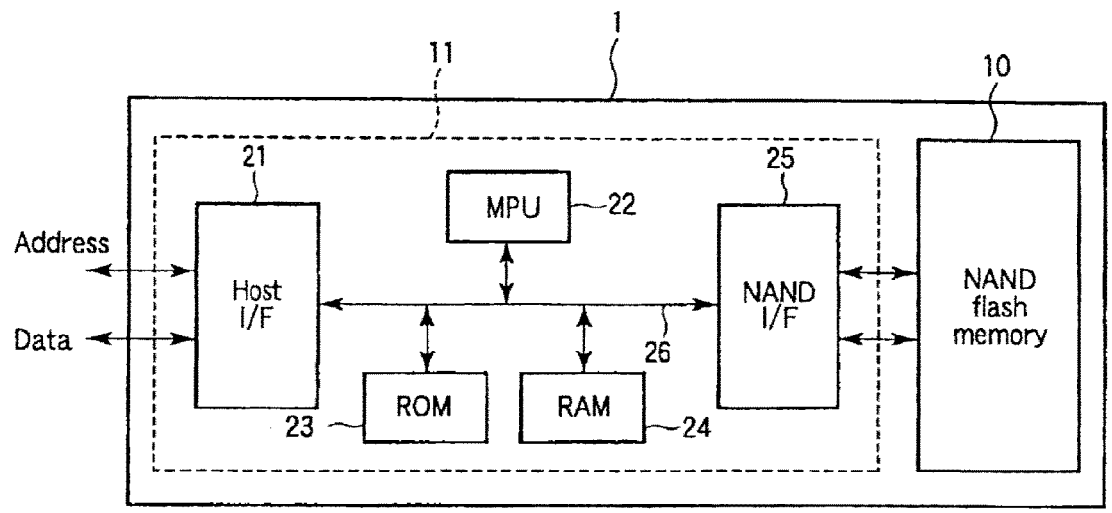
FIG. 2 is a schematic view showing the configuration of the memory system 1 according to the first embodiment.

FIG. 2 is a schematic view showing the configuration of the memory system 1. The memory system 1 comprises the NAND flash memory 10 and NAND controller 11. The NAND controller 11 includes a host interface circuit (host I/F) 21, micro processing unit (MPU) 22, read only memory (ROM) 23, random access memory (RAM) 24, and NAND interface circuit (NAND I/F) 25.

The host interface circuit 21 performs interface processing between the NAND controller 11 and the host devices (CPU 2, main memory 3 and the like) in accordance with a predetermined protocol.

The MPU 22 controls the overall operation of the memory system 1. When the power supply of the memory system 1 is turned on, for example, the MPU 22 reads firmware (a control program) stored in the ROM 23 onto the RAM 24 and executes predetermined processing, thereby forming various tables on the RAM 24. The MPU 22 also receives a write request, read request, and erase request from the host devices, and executes predetermined processing on the NAND flash memory 10 in accordance with these requests.

The ROM 23 stores, e.g., the control program to be controlled by the MPU 22. The RAM 24 is used as a work area of the MPU 22, and stores the control program and various tables loaded from the ROM 23. The NAND interface circuit 25 performs interface processing between the NAND controller 11 and NAND flash memory 10 in accordance with a predetermined protocol.

Figure 3A:
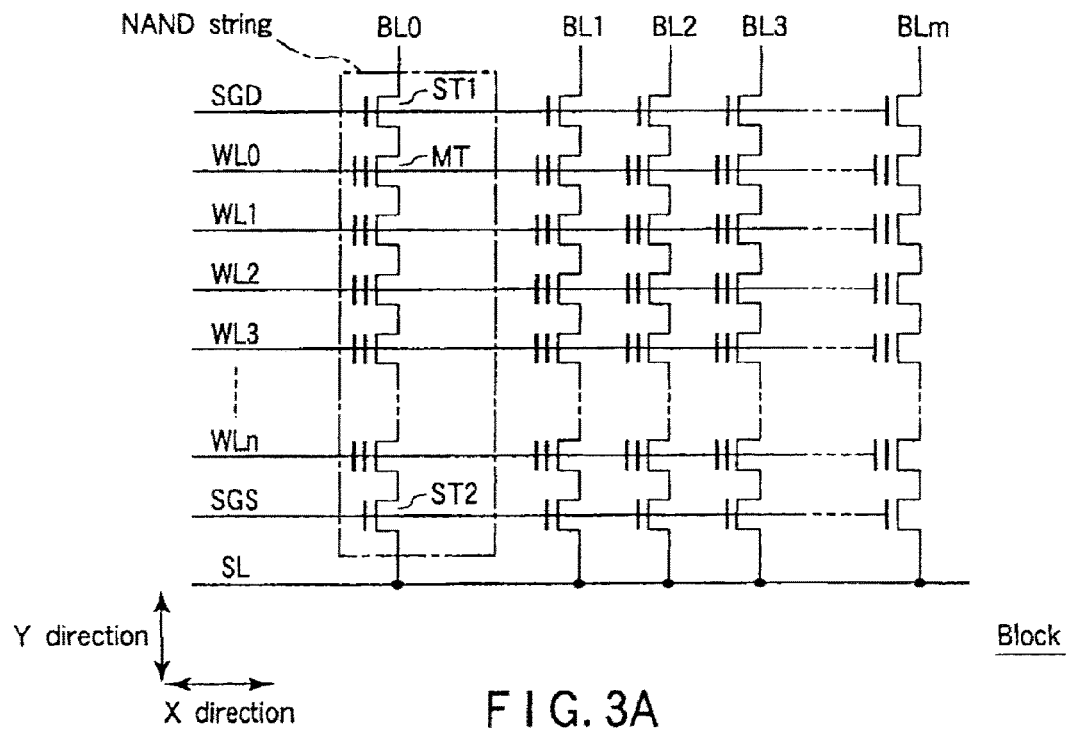
FIG. 3A is a circuit diagram showing the arrangement of a block included in a NAND flash memory 10.

The NAND flash memory 10 is formed by arranging a plurality of blocks as minimum units of data erase. FIG. 3A is a circuit diagram showing the arrangement of a block included in the NAND flash memory 10. Each block includes (m+1) NAND strings arranged in order along the X direction (m is an integer of 0 or more). A selection transistor ST1 included in each of the (m+1) NAND strings has a drain connected to a corresponding one of bit lines BL0 to BLm, and a gate connected to a common selection gate line SGD. A selection transistor ST2 included in each of the (m+1) NAND strings has a source connected to a common source line SL, and a gate connected to a common selection gate line SGS.

In each NAND string, (n+1) memory cell transistors MT are arranged between the source of the selection transistor ST1 and the drain of the selection transistor ST2 such that the current paths of the memory cell transistors MT are connected in series (n is an integer of 0 or more). That is, the (n+1) memory cell transistors MT are connected in series in the Y direction such that adjacent transistors share the diffusion region (source region or drain region).

Control gate electrodes are connected to word lines WL0 to WLn in order from the memory cell transistor MT positioned closest to the drain side. Accordingly, the drain of the memory cell transistor MT connected to the word line WL0 is connected to the source of the selection transistor ST1, and the source of the memory cell transistor MT connected to the word line WLn is connected to the drain of the selection transistor ST2.

The word lines WL0 to WLn connect the control gate electrodes of the memory cell transistors MT together between the NAND strings in the block. That is, the control gate electrodes of the memory cell transistors MT in the same row in the block are connected to the same word line WL. The (m+1) memory cell transistors MT connected to the same word line WL are handled as a page, and data write and read are performed page by page.

The bit lines BL0 to BLm connect the drains of the selection transistors ST1 together between the blocks. That is, the NAND strings in the same column in a plurality of blocks are connected to the same bit line BL.

Each memory cell transistor MT is a metal oxide semiconductor field effect transistor (MOSFET) having a stacked gate structure formed on a semiconductor substrate. The stacked gate structure is formed by sequentially stacking a gate insulating film, charge storage layer (floating gate electrode), inter gate insulating film, and control gate electrode on the semiconductor substrate. The memory cell transistor MT changes its threshold voltage in accordance with the number of electrons stored in the floating gate electrode, and stores data in accordance with the difference between the threshold voltages. The memory cell transistor MT can be designed to store binary data (one bit) or multilevel data (data having two or more bits).

The structure of the memory cell transistor MT is not limited to the structure having the floating gate electrode, and may also be a structure such as a metal oxide nitride oxide silicon (MONOS) structure in which the threshold value can be adjusted by trapping electrons in the interface of a nitride film as a charge storage layer. The memory cell transistor MT having this MONOS structure may also be designed to store one bit or multilevel data (data having two or more bits).

FIG. 3B shows an example of a threshold distribution obtained when a four-level data recording system is employed, i.e., a system wherein two bits are recorded in one memory transistor MT.

In the four-level data recording system, one of four-level data "xy" defined by upper page data "x" and lower page data "y" can be retained in memory cell transistor MT.

Data "11", "01", "00" and "10" (which are in the ascending order of the threshold voltage of the memory cell transistor MT) are assigned as the four-level data "xy." Data "11" represents an erase state where the threshold voltage of the memory cell transistor MT is negative.

In the lower page write, data "10" is written by selectively writing lower bit data "y" in the memory cell transistor MT which is in the data "11" state (erase state).

The threshold distribution of data "10", which is before the upper page write, is located between the threshold distributions of data "01" and data "00", which are after the upper page write. The threshold distribution of data "10" is allowed to be broader than the threshold distributions of data after the upper page write.

In the upper page write, upper bit data "x" is selectively written in the memory cell which is in the data "11" state and the memory cells which is in the data "10" state.

Each functional block in each embodiment of the present invention can be implemented by hardware, software, or a combination of the hardware and software. Therefore, each functional block will be explained below from the viewpoint of its function in order to clearly show that the block can be one or both of hardware and software. Whether the function is implemented as hardware or software depends on a practical embodiment or design limitations imposed on the whole system. Those skilled in the art can implement these functions by various methods for each practical embodiment, and the scope of the present invention includes determination of the implementation.

One example of the concrete configuration of the NAND controller 11 is explained. FIG. 4 is a block diagram for explaining one example of the NAND controller 11.

The NAND controller 11 includes a block controller 30, erase-time measuring unit 31, allocation block selector 32, replacement-source block selector 33, replacement-destination block selector 34, leveling unit 35 and NAND interface circuit (NAND I/F) 25.

The erase-time measuring unit 31 measures erase time of the block whenever data of each block of the NAND flash memory 10 is erased. Then, the erase-time measuring unit 31 sends the erase time to the block controller 30.

The block controller 30 manages various information items (containing the erase time) for each block. Further, the block controller 30 issues a write request, read request and erase request to the NAND flash memory 10 in response to a transfer request from the CPU 2. Specifically, the block controller 30 has an address table 30A and block table 30B that will be described later and issues the write request, read request and erase request by use of the above tables.

When the allocation block selector 32 writes new data supplied from the external unit (CPU 2 or main memory 3), for example, into the NAND flash memory 10, it selects a block allocated for the write process (that is hereinafter referred to as an allocation block). Then, the allocation block selector 32 sends a block number (allocation block number) corresponding to the allocation block to the block controller 30. As data to be written into the NAND flash memory 10, two types of data items including user data supplied from the exterior of the memory system 1 and system data required for management of the internal portion of the memory system 1 are provided.

The leveling unit 35 performs a leveling process that will be described later. The leveling unit 35 issues a write request, read request and erase request to the NAND flash memory 10 when performing the leveling process. The leveling process means that the numbers of erase processes of blocks are set approximately uniform (a so-called wear leveling process). Thus, since the erase process can be prevented from being concentrated in part of the blocks by setting the numbers of erase processes of blocks approximately uniform, the service life of the NAND flash memory 10 can be extended.

The replacement-source block selector 33 selects a block of a data replacement source (that is hereinafter referred to as a replacement-source block) used for the leveling process by the leveling unit 35. The replacement-destination block selector 34 selects a block of a data replacement destination (that is hereinafter referred to as a replacement-destination block) used for the leveling process by the leveling unit 35.

The NAND interface circuit 25 receives the write request, read request and erase request from the block controller 30 and leveling unit 35. Then, the NAND interface circuit 25 informs the NAND flash memory 10 of the data write operation, read operation and erase operation according to the above requests.

Figure 5:
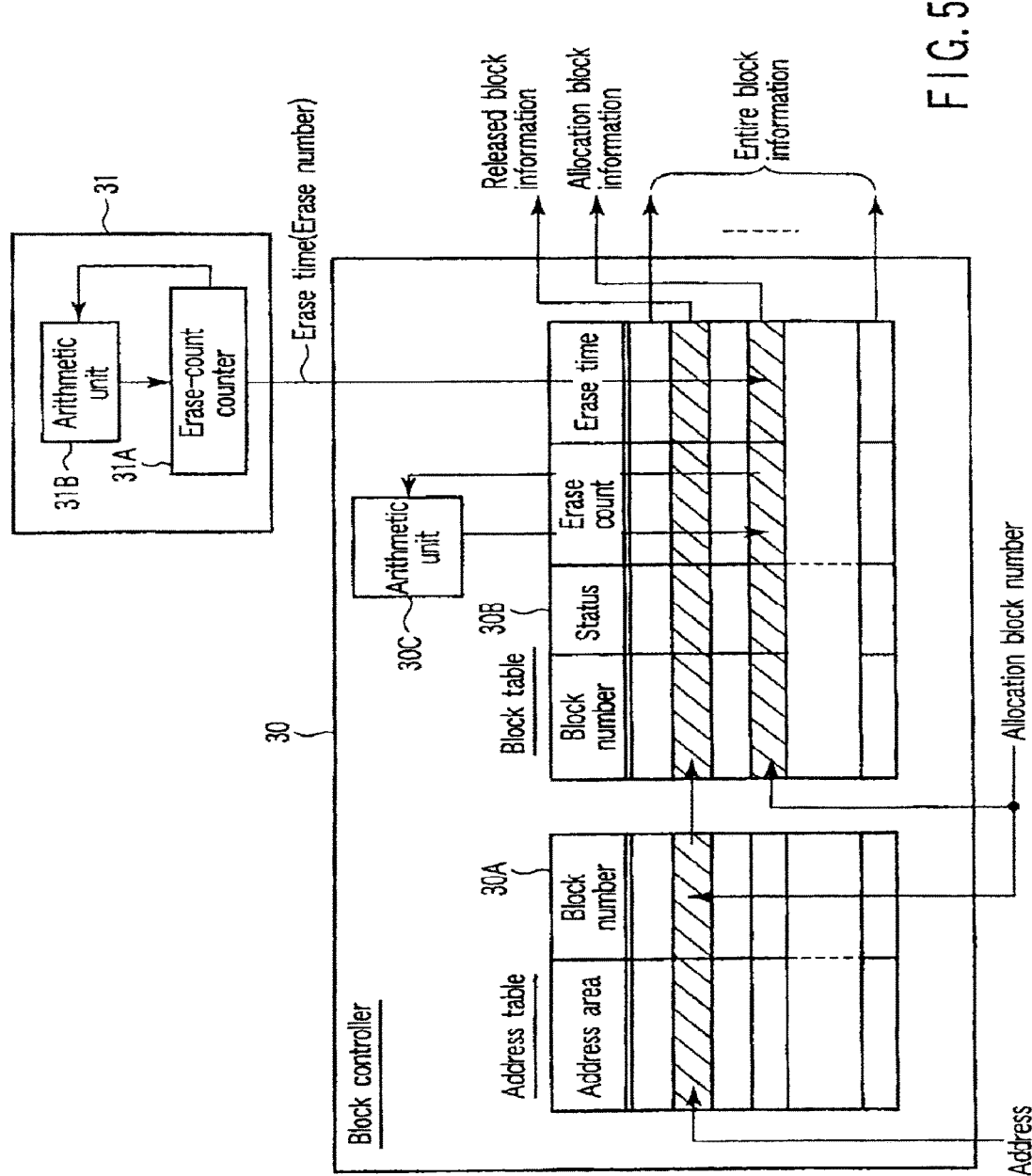
FIG. 5 is a block diagram showing the configuration of a block controller 30 and erase-time measuring unit 31.

FIG. 5 is a block diagram showing the configuration of the block controller 30 and erase-time measuring unit 31. The block controller 30 includes an address table 30A, block table 30B and arithmetic unit 30C.

The address table 30A shows the relation between an address area (logical block addresses) containing addresses supplied from the host device (CPU 2) via an address bus and a block number (physical block addresses) in the NAND flash memory 10 that corresponds to the address area. The block controller 30 can specify one of the blocks to which data in the address area containing an address supplied from the host device corresponds by using the address table 30A. For example, the address table 30A is updated at the time of a block release process and block allocation process that will be described later.

The block table 30B stores a block state indicating that no block number is set in the address table 30A (that is hereinafter referred to as a free state) or a block number is set in the address table 30A (that is hereinafter referred to as an in-use state), the number by which data is erased (erase count) and erase time supplied from the erase-time measuring unit 31 as information. For example, the block table 30B is updated at the time of a block release process, block allocation process and block erase process that will be described later.

When the block state is set in a free state, an address area corresponding to the block is recognized as a free area in which no data is stored as viewed from the host device irrespective of whether or not an erase process is actually performed for the block in the NAND flash memory 10. On the other hand, when the block state is set in an in-use state, an address area corresponding to the block is recognized as an in-use area in which data is stored as viewed from the host device.

In practice, the address table 30A and block table 30B are stored in the RAM 24 or in both of the RAM 24 and NAND flash memory 10. However, the address table 30A and block table 30B stored in the NAND flash memory 10 in a nonvolatile fashion are not always necessary to be updated whenever the RAM 24 is updated.

The arithmetic unit 30C counts up the erase count for the block subjected to the erase process contained in the block table 30B by "1" whenever data of the NAND flash memory 10 is erased. In practice, the process of the arithmetic unit 30C is performed by the MPU 22.

The block controller 30 receives an allocation block number from the allocation block selector 32. Then, the block controller 30 updates the block number of the address table 30A by using the allocation block number. Further, the block control nit 30 sends information (allocation block information) in the block table 30B corresponding to the allocation block number and information (released block information) of the block released at the block allocation time to the leveling unit 35.

The block controller 30 sends information items of all of the blocks (entire block information) contained in the NAND flash memory 10 to the allocation block selector 32, replacement-source block selector 33 and replacement-destination block selector 34 by using the block table 30B.

The erase-time measuring unit 31 includes an erase-count counter 31A that counts the erase count and an arithmetic unit 31B that updates the count value of the erase-count counter 31A. The erase-time measuring unit 31 measures the number of erase processes performed for the block in the NAND flash memory 10 and outputs the thus measured number as erase time.

Specifically, the arithmetic unit 31B counts up the erase-count counter 31A by "1" whenever any one of the blocks is erased. The count value (erase number) of the erase-count counter 31A is supplied to the block controller 30 (specifically, block table 30B) as erase time. In the erase-time measuring unit 31 of this example, the erase time becomes older as the erase number is set smaller. In practice, the process of the arithmetic unit 31B is performed by the MPU 22.

As the erase time, time at which the erase process is performed (erase timing), the power supply time of the NAND controller 11 or the like can be used in addition to the above case. In a case where the erase timing is used as the erase time, the erase-time measuring unit 31 has a timepiece and outputs timing at which the erase process is performed as erase time. In a case where the power supply time is used as the erase time, the erase-time measuring unit 31 has a timer, measures the power supply time up to each erase process whenever the erase process is performed and outputs the power supply time as erase time. Thus, the erase count, erase timing or power supply time can be freely selected and used as the erase time. If information that can specify the erase time is used, information other than the above three types can be used.

[2. Write Operation of NAND Controller 11]

Figure 6:
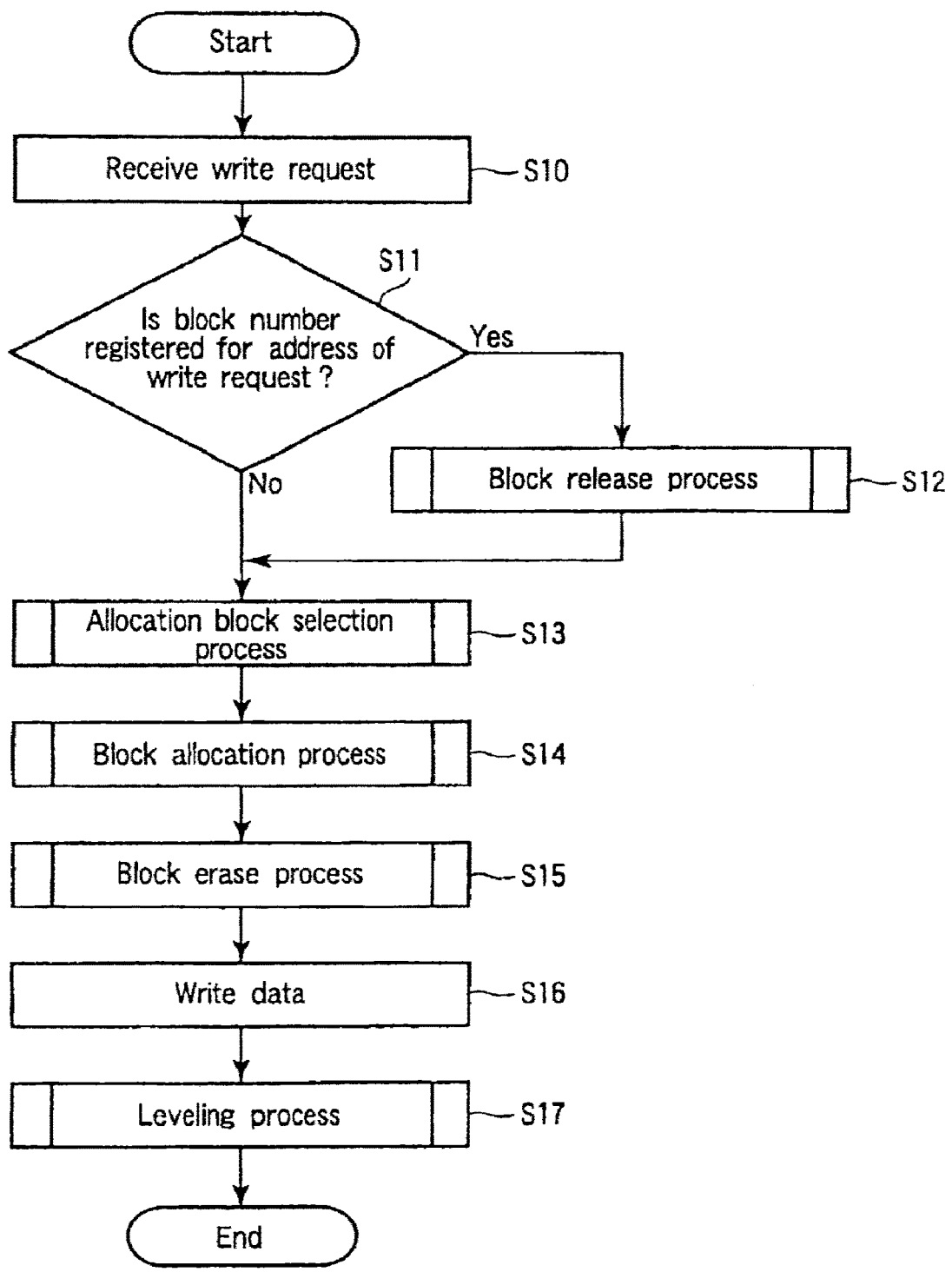
FIG. 6 is a flowchart for illustrating a series of write operations of the NAND controller 11.

Next, the write operation of the NAND controller 11 is explained. FIG. 6 is a flowchart for illustrating a series of write operations of the NAND controller 11.

First, the NAND controller 11 receives a write request from the CPU 2 and starts the write operation (step S10). Then, the block controller 30 determines whether or not a block number is registered (a block is allocated) with respect to an address area containing an address of the write request by using the address table 30A (step S11). If the block number is registered (the block is allocated), a data over-writing process is required for the address area, and therefore, the NAND controller 11 performs a block release process of releasing a block corresponding to the block number (step S12).

If it is determined in step S11 that the block number is not registered (the block is not allocated) or after the block release process is performed in step S12, the allocation block selector 32 performs an allocation block selection process of selecting a block (allocation block) allocated to the address area (step S13).

Next, the block controller 30 performs a block allocation process to update the address table 30A and block table 30B by using a block number (allocation block number) corresponding to the allocation block (step S14). Then, the block controller 30 performs a block erase process for the allocation block (step S15).

After this, the block controller 30 writes data into the erased allocation block (step S16). That is, the block controller 30 issues a write request to the NAND interface circuit 25. The NAND interface circuit 25 informs the NAND flash memory 10 that data is written into the allocation block based on the write request.

Next, the NAND controller 11 performs a leveling process (step S17). After the end of the leveling process, a series of write operations of the NAND controller 11 is terminated. The leveling process in step S17 may be performed before the allocation block selection process in step S13.

The respective processes contained in the write operation are explained below.

[2-1. Block Release Process]

Figure 7:
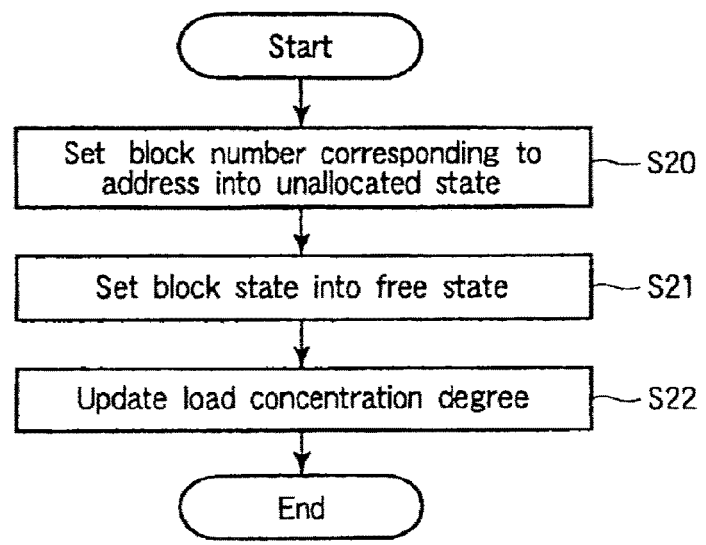
FIG. 7 is a flowchart for illustrating a block release operation of the NAND controller 11.

FIG. 7 is a flowchart for illustrating a block release process of the NAND controller 11. The block controller 30 sets a block number corresponding to an address area containing an address of the write request and contained in the address table 30A into an unallocated state (step S20). Next, the block controller 30 sets the state of the block number contained in the block table 30B into a free state. The block newly set into the free state in the block release process is hereinafter referred to as a released block (step S21).

Then, the block controller 30 sends information of the released block (released block information) contained in the block table 30B to the leveling unit 35. The released block information contains at least erase time of a released block number. The leveling unit 35 updates the degree of load concentration that will be described later by using the released block information (step S22).

[2-2. Allocation block Selection Process]

Figure 8:
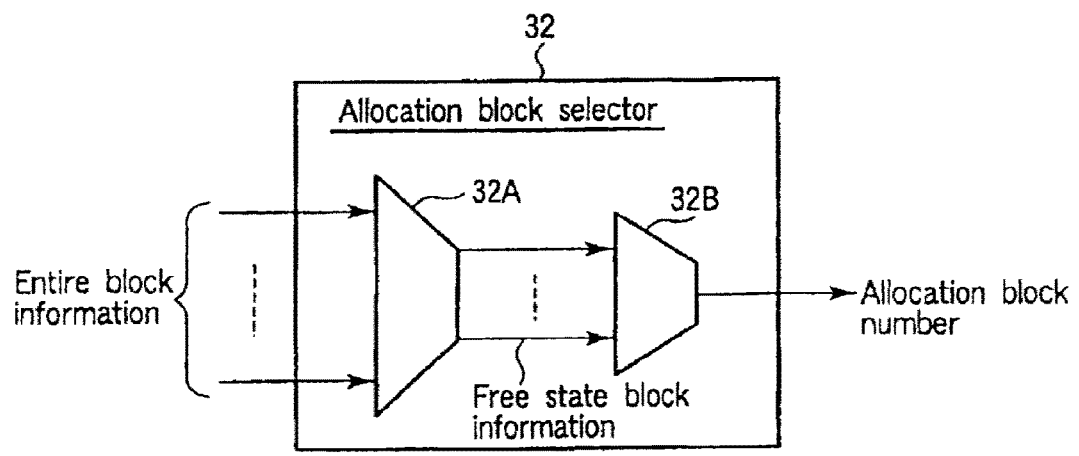
FIG. 8 is a block diagram showing the configuration of an allocation block selector 32.

FIG. 8 is a block diagram showing the configuration of the allocation block selector 32. FIG. 9 is a flowchart for illustrating the allocation block selection process of the allocation block selector 32.

The allocation block selector 32 has two selectors 32A and 32B. The allocation block selector 32 receives entire block information from the block controller 30 (step S30). The entire block information is supplied to the selector 32A. Then, the selector 32A confirms the states of all of the blocks and extracts blocks in the free state from all of the blocks (step S31). After this, the selector 32A sends block information (free state block information) corresponding to the free state block to the selector 32B.

Next, the selector 32B selects a block corresponding to the oldest erase time among the blocks extracted by the selector 32A as an allocation block (step S32). An allocation block number corresponding to the allocation block is supplied to the block controller 30.

[2-3. Block Allocation Process]

FIG. 10 is a flowchart for illustrating the block allocation process of the NAND controller 11. The block controller 30 sets a block number of the allocation block into an address area including an address of the write request and contained in the address table 30A (step S40). Then, the block controller 30 sets the state of the block number contained in the block table 30B into an in-use state (step S41).

Next, the block controller 30 sends information (allocation block information) of the allocation block contained in the block table 30B to the leveling unit 35. The allocation block information contains at least erase time of the allocation block number. The leveling unit 35 updates the degree of load concentration that will be described later by using the allocation block information (step S42).

[2-4. Block Erase Process]

Figure 11:
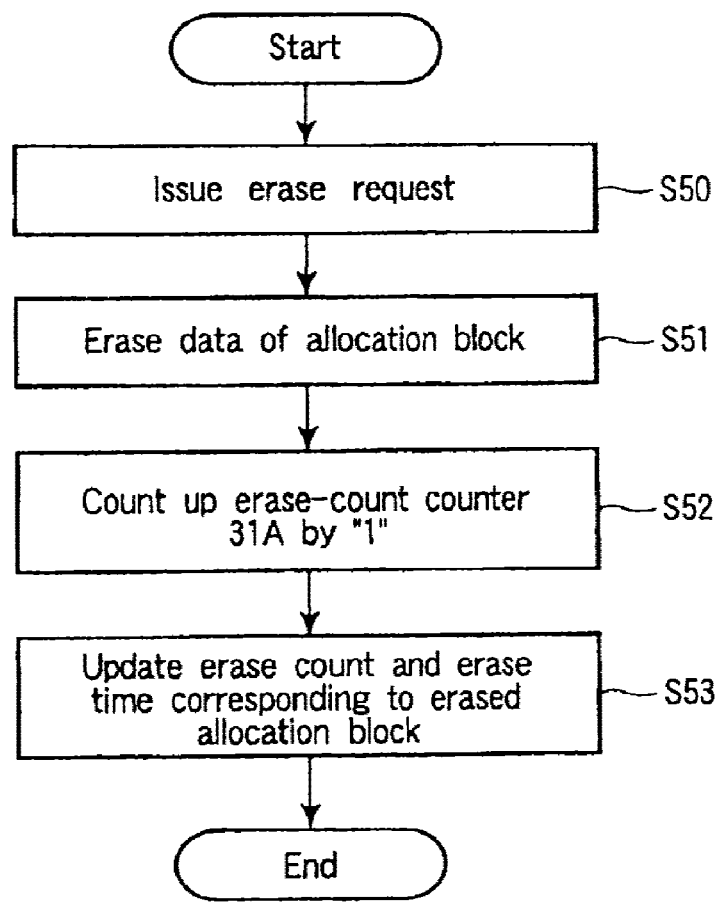
FIG. 11 is a flowchart for illustrating a block erase process of the NAND controller 11.

FIG. 11 is a flowchart for illustrating a block erase process of the NAND controller 11. The block controller 30 issues an erase request for the allocation block to the NAND interface circuit 25 (step S50). In response to the erase request, the NAND interface circuit 25 informs the NAND flash memory 10 that data of the allocation block is erased (step S51). Then, the erase-time measuring unit 31 (specifically, the arithmetic unit 31B) counts up the count value (erase number) of the erase-count counter 31A by "1" (step S52).

Next, the block controller 30 updates an erase count and erase time corresponding to the erased allocation block contained in the block table 30B (step S53). Specifically, the block controller 30 updates the erase time corresponding to the block number of the erased allocation block contained in the block table 30B by using the erase time supplied from the erase-time measuring unit 31. Further, the arithmetic unit 30C counts up the erase count corresponding to the block number of the erased allocation block contained in the block table 30B by "1".

[2-5. Leveling Process]

In order to extend the service life of the NAND flash memory 10, it is necessary to set the erase counts of the respective blocks approximately equal to one another and, at the same time, avoid the rewrite process from being frequently performed for a specified area in a short period. If an attempt is made to extend the service life of the NAND flash memory 10 by setting the erase counts of the respective blocks approximately equal to one another, the rewrite process for the specified area may excessively proceed in a short period depending on the write state. If the correction (leveling) process is frequently performed in the short period, the number of erase processes caused by the correction process will be increased and, as a result, the service life cannot be extended although the erase counts can be made approximately uniform and the concentration of write processes with respect to the specified area in the short period can be avoided. On the other hand, if the correction interval is made excessively long, the erase processes with short intervals are concentrated in the specified area and the service life is reduced. By taking the above fact into consideration, in the leveling unit of the present embodiment, the number of leveling processes is set to an optimum value and the erase counts of the respective blocks are set approximately uniform.

Figure 12:
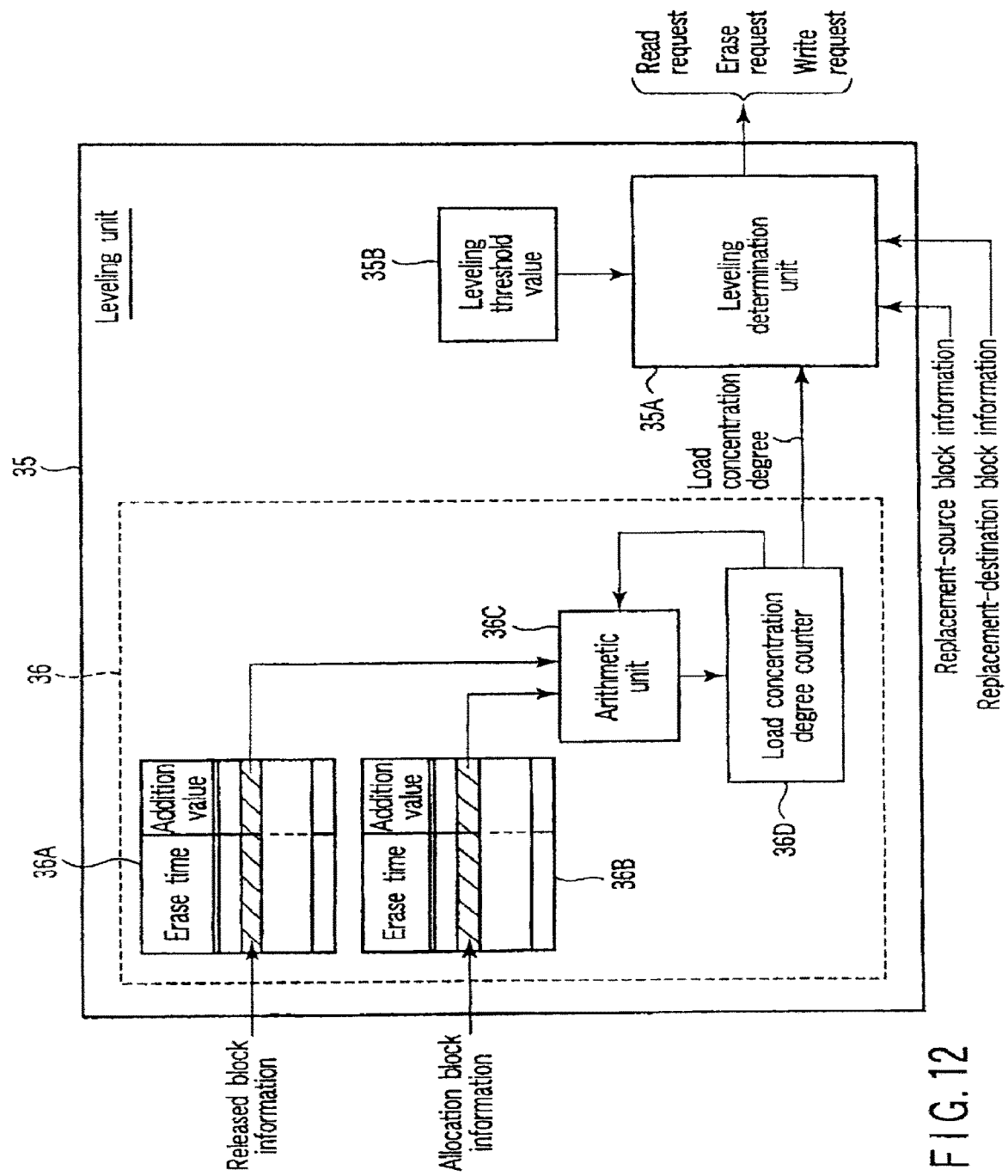
FIG. 12 is a block diagram showing the configuration of a leveling unit 35.

The leveling process is performed by use of the leveling unit 35, replacement-source block selector 33 and replacement-destination block selector 34. As described before, the leveling process may be performed before the allocation block selection process (step S13) of FIG. 6. FIG. 12 is a block diagram showing the configuration of the leveling unit 35.

The leveling unit 35 includes a load concentration degree management unit 36, a leveling determination unit 35A and a storage unit 35B that stores a leveling threshold value. The leveling determination unit 35A determines whether or not the leveling process is performed at the present write operation time by use of the leveling threshold value and the load concentration degree supplied from the load concentration degree management unit 36. When the leveling process is performed, the leveling determination unit 35A supplies a read request, erase request and write request accompanied by the leveling process to the NAND interface circuit 25.

The load concentration degree management unit 36 includes a released block addition value table 36A, allocation block addition value table 36B, arithmetic unit 36C and load concentration degree counter 36D. The load concentration degree management unit 36 receives released block information and allocation block information from the block controller 30.

The released block addition value table 36A indicates the correspondence relation between a plurality of erase times and a plurality of addition values corresponding thereto. The magnitudes of the addition values vary according to the erase time and can be set to a positive value, zero and negative value. The addition value is set larger as the erase time is newer and set smaller as the erase time is older. In a more simplified case, a constant negative addition value may be output when the erase time exceeds a preset value and a constant positive addition value may be output when the erase time does not exceed the preset value. The released block addition value table 36A supplies an addition value corresponding to the erase time contained in the released block information to the arithmetic unit 36C.

Likewise, the allocation block addition value table 36B indicates the correspondence relation between a plurality of erase times and a plurality of addition values corresponding thereto. The magnitudes of the addition values vary according to the erase time and can be set to a positive value, zero and negative value. The addition value is set larger as the erase time is newer and set smaller as the erase time is older. In a more simplified case, a constant negative addition value may be output when the erase time exceeds a preset value and a constant positive addition value may be output when the erase time does not exceed the preset value. The allocation block addition value table 36B supplies an addition value corresponding to the erase time contained in the allocation block information to the arithmetic unit 36C.

The arithmetic unit 36C updates the count value of the load concentration degree counter 36D by using the addition values supplied from the released block addition value table 36A and allocation block addition value table 36B. In practice, the process of the arithmetic unit 36C is performed by the MPU 22. The load concentration degree counter 36D supplies the count value as the load concentration degree to the leveling determination unit 35A. Whether or not the erase processes with short intervals are frequently performed can be determined according to the value of the load concentration degree.

FIG. 13 is a flowchart for illustrating the leveling process of the NAND controller 11. The leveling determination unit 35A determines whether or not the load concentration degree supplied from the load concentration degree management unit 36 exceeds the leveling threshold value (step S60). The leveling threshold value is used to determine whether the leveling process is to be performed or not and is set based on a criterion for the extent to which the service life (or data retention period) of the NAND flash memory 10 is extended.

The retention characteristic of the NAND flash memory 10 is degraded (that is, the service life is reduced) whenever data is erased. If the erase interval becomes longer, the retention characteristic of the NAND flash memory 10 is gradually recovered. That is, if the erase processes are successively performed at short intervals, the service life of the NAND flash memory 10 is reduced since the sufficiently long recovery time of the retention characteristic cannot be attained. Therefore, in the present embodiment, the criterion used to determine whether the erase interval is long or short is replaced with the criterion used to determine whether the load concentration degree is high or low. Then, whether or not the erase processes are successively performed at short intervals is determined based on whether or not the load concentration degree exceeds the leveling threshold value and only when the load concentration degree has exceeded the leveling threshold value, the leveling process is performed to prevent the erase processes from being concentrated with respect to part of the blocks. When the leveling threshold value is set, the characteristic of the NAND flash memory 10 indicating the degree by which the service life can be recovered by extending the erase interval by a preset period is taken into consideration.

If it is determined in step S60 that the load concentration degree exceeds the leveling threshold value, the replacement-source block selector 33 performs the replacement-source block selection process (step S61). Information (replacement-source block information) of the replacement-source block selected by the replacement-source block selection process is supplied to the leveling determination unit 35A. Then, the replacement-destination block selector 34 performs the replacement-destination block selection process (step S62). Information (replacement-destination block information) of the replacement-destination block selected by the replacement-destination block selection process is supplied to the leveling determination unit 35A.

Then, the block controller 30 and load concentration degree management unit 36 perform a block release process to release a replacement-source block selected by the replacement-source block selector 33 (step S63). The block release process is the same as that of FIG. 7. Next, the block controller 30 and load concentration degree management unit 36 perform a block allocation process to allocate a replacement-destination block selected by the replacement-destination block selector 34 as a block into which data of the replacement-source block is moved (step S64). The block allocation process is the same as that of FIG. 10.

After this, the NAND controller 11 reads data of the replacement-source block contained in the NAND flash memory 10 (step S65). Specifically, the leveling determination unit 35A issues a read request to the NAND interface circuit 25 by using replacement-source block information supplied from the replacement-source block selector 33. Based on the read request, the NAND interface circuit 25 informs the NAND flash memory 10 that data is read from the replacement-source block. The thus read data is temporarily stored in the RAM 24 or the like.

Then, the NAND controller 11 erases data of the replacement-destination block contained in the NAND flash memory 10 (step S66). Specifically, the leveling determination unit 35A issues an erase request to the NAND interface circuit 25 by using replacement-destination block information supplied from the replacement-destination block selector 34. Based on the erase request, the NAND interface circuit 25 informs the NAND flash memory 10 that data of the replacement-destination block is erased. At this time, the erase count and erase time of the replacement-destination block are updated by the block controller 30 (see FIG. 11).

Next, the NAND controller 11 writes data read from the replacement-source block into the replacement-destination block contained in the NAND flash memory 10 (step S67). Specifically, the leveling determination unit 35A issues a write request to the NAND interface circuit 25 by using replacement-destination block information. Based on the write request, the NAND interface circuit 25 informs the NAND flash memory 10 that data is written into the replacement-destination block.

[2-5-1. Replacement-Source Block Selection Process]

FIG. 14 is a block diagram showing the configuration of the replacement-source block selector 33. FIG. 15 is a flowchart for illustrating the replacement-source block selection process of the replacement-source block selector 33.

The replacement-source block selector 33 has three selectors 33A to 33C and a storage unit 33D that stores a replacement-source block setting value. The replacement-source block selector 33 receives entire block information from the block controller 30 (step S70). The entire block information is supplied to the selector 33A. Then, the selector 33A confirms the states of all of the blocks and extracts blocks that are set in an in-use state from all of the blocks (step S71). After this, the selector 33A supplies block information (in-use state block information) corresponding to the blocks set in the in-use state to the selector 33B.

Next, the selector 33B extracts block information with conditions set according to the replacement-source block setting value from the in-use state block information (step S72). As the replacement-source block setting value, one of the following conditions is set.

(A) A preset number of blocks starting from the block with the oldest erase time (B) A preset ratio of blocks starting from the block with the oldest erase time (C) Blocks whose erase time is older than preset time One of the conditions (A) to (C) that is used as the replacement-source block setting value can be freely selected. For example, if the condition (A) is used as the replacement-source block setting value, the selector 33B extracts a preset number of blocks starting from the block with the oldest erase time from the blocks set in the in-use state. Then, the selector 33B sends block information corresponding to the extracted blocks to the selector 33C.

In the conditions (A) and (B), blocks set in the free state are sorted in an order of erase times and a preset number or a preset ratio of blocks starting from the block with the oldest erase time are searched for. Therefore, since the number of blocks selected in step S72 can be increased, the probability that blocks with a smaller erase count are selected in step S73 can be enhanced. In the condition (C), since it is sufficient to sort only blocks that are set in the free state and in which the erase time exceeds the preset time, the processing load becomes minimum. In the conditions (A) and (B), a preset number or a preset ratio of blocks starting from the block with the oldest erase time are always extracted and, in the condition (C), blocks whose erase times are separated by a preset period or longer are extracted. Therefore, in the condition (C), the erase interval can always be set longer than a preset interval, and therefore, the number of comparison candidates of the erase count can be decreased.

Next, the selector 33C selects the block of the smallest erase count among the blocks extracted by the selector 33B as the replacement-source block (step S73). Replacement-source block information corresponding to the replacement-source block is supplied to the leveling determination unit 35A.

A block of an excellent retention characteristic in which data that is not frequently rewritten is stored can be selected as the replacement-source block by the above replacement-source block selection process.

[2-5-2. Replacement-Destination Block Selection Process]

FIG. 16 is a block diagram showing the configuration of the replacement-destination block selector 34. FIG. 17 is a flowchart for illustrating the replacement-destination block selection process of the replacement-destination block selector 34.

The replacement-destination block selector 34 has three selectors 34A to 34C and a storage unit 34D that stores a replacement-destination block setting value. The replacement-destination block selector 34 receives entire block information from the block controller 30 (step S80). The entire block information is supplied to the selector 34A. Then, the selector 34A confirms the states of all of the blocks and extracts blocks that are set in a free state among all of the blocks (step S81). After this, the selector 34A supplies block information (free state block information) corresponding to the blocks set in the free state to the selector 34B.

Next, the selector 34B extracts block information with conditions set according to the replacement-destination block setting value from the free state block information (step S82). As the replacement-destination block setting value, one of the following conditions is set.

(A) A preset number of blocks starting from the block with the oldest erase time (B) A preset ratio of blocks starting from the block with the oldest erase time (C) Blocks whose erase time is older than preset time One of the conditions (A) to (C) that is used as the replacement-destination block setting value can be freely selected. For example, if the condition (A) is used as the replacement-destination block setting value, the selector 34B extracts a preset number of blocks starting from the block with the oldest erase time from the blocks set in the free state. Then, the selector 34B sends block information corresponding to the extracted blocks to the selector 34C.

In the conditions (A) and (B), blocks set in the free state are sorted in an order of erase times and a preset number or a preset ratio of blocks starting from the oldest block are searched for. Therefore, since the number of blocks selected in step S82 can be made large, the probability that blocks with a smaller erase count are selected in step S83 can be enhanced. In the condition (C), since it is sufficient to sort only blocks set in the free state in which the erase time exceeds the preset time, the processing load becomes minimum. In the conditions (A) and (B), a preset number or a preset ratio of blocks starting from the block with the oldest erase time are always extracted and, in the condition (C), blocks whose erase times are separated by a preset period or longer are extracted. Therefore, in the condition (C), the erase interval can always be set longer than a preset interval, and therefore, the number of comparison candidates of the erase count can be decreased.

Next, the selector 34C selects the block of the largest erase count among the blocks extracted by the selector 34B as the replacement-destination block (step S83). Replacement-destination block information corresponding to the replacement-destination block is supplied to the leveling determination unit 35A.

A block set in a free state in which a retention characteristic is degraded to some extent can be selected as the replacement-destination block by the above replacement-destination block selection process. After this, data that has been stored in the replacement-source block and is not frequently rewritten is stored into the replacement-destination block. As a result, the data erase count can be reduced and the retention characteristic can be recovered for the replacement-destination block.

As described above, according to the present embodiment, the erase time at which each block is erased is measured and the blocks and the erase times thereof that are set in a correspondence relation are stored into the block table 30B. Then, when data supplied from the exterior is written into the NAND flash memory 10, the block corresponding to the oldest erase time among the blocks set in the free state is selected as an allocation block and the above data is written into the allocation block.

Therefore, according to the present embodiment, since the erase interval can be set long for each block, degradation in the retention characteristic of each block can be suppressed by using the characteristic of the memory cell transistor whose retention characteristic can be recovered by setting the erase interval long. As a result, the service life of the NAND flash memory 10 can be extended.

Further, in the present embodiment, the degradation in the retention characteristic of the NAND flash memory 10 is specified as the load concentration degree by the load concentration degree management unit 36 and if the load concentration degree exceeds the leveling threshold value, the leveling process is performed. Thus, the number of leveling processes can be set to an optimum value without frequently performing the leveling process and the erase counts of the respective blocks can be made substantially uniform. As a result, the service life of the whole portion of the NAND flash memory 10 can be prevented from being reduced by increasing the erase count of part of the blocks.

Further, a block in which data that is not frequently rewritten is stored is selected as a replacement-source block by the replacement-source block selection process and a block in which the retention characteristic is degraded to some extent is selected as a replacement-destination block by the replacement-destination block selection process. Then, data that has been stored in the replacement-source block and is not frequently rewritten is moved to the replacement-destination block. Thus, the block that is once written, kept allocated and not released for a long period can be released by performing the leveling process. As a result, the number of data erase processes performed after this for the replacement-destination block can be reduced and degradation in the retention characteristic of the replacement-destination block can be suppressed.

In the case where multi-level data recording system is applied, fine control is required for the threshold distributions of the transistors MT of a memory cell. It is therefore advantageous to prevent the degradation of the retention characteristics.

Second Embodiment

A second embodiment of this invention shows another example of the allocation block selection process by the allocation block selector 32. When an allocation block is selected, a block whose erase time is old and whose erase count is small is selected as the allocation block.

Figure 18:
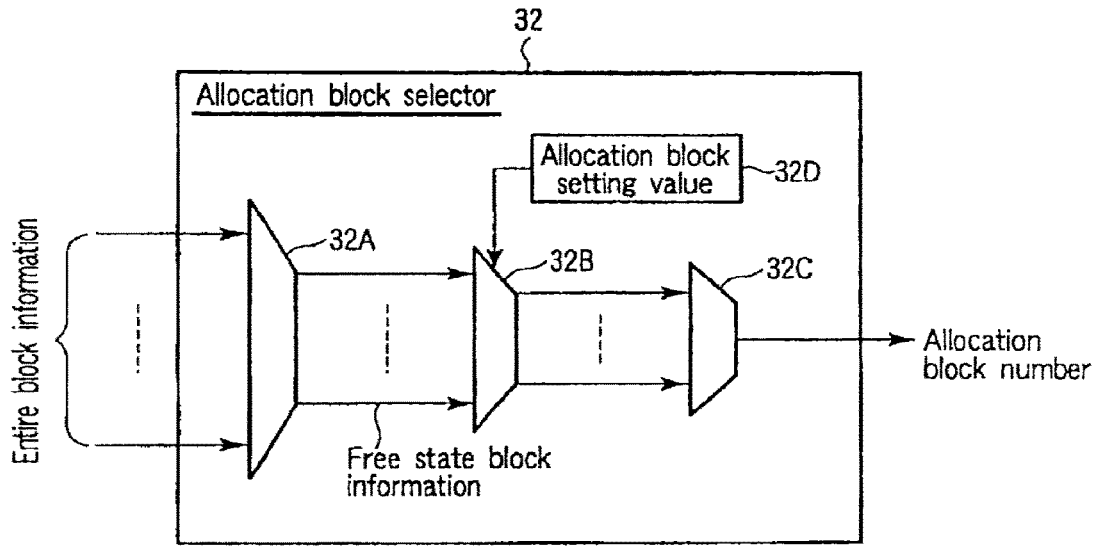
FIG. 18 is a block diagram showing the configuration of an allocation block selector 32 according to a second embodiment of this invention.
Figure 19:
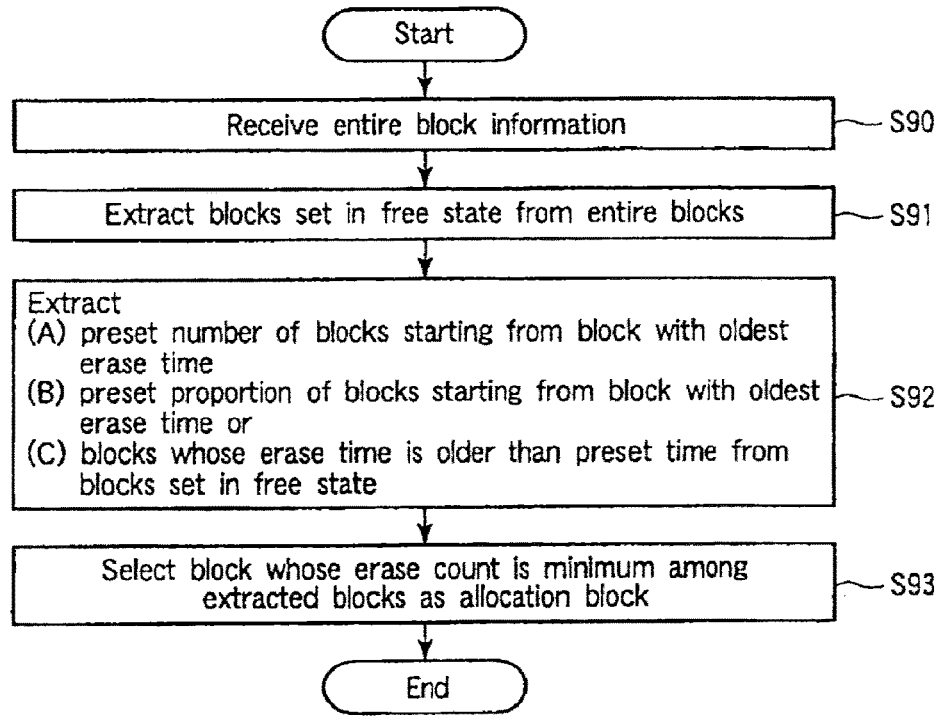
FIG. 19 is a flowchart for illustrating an allocation block selection process of the allocation block selector 32.

FIG. 18 is a block diagram showing the configuration of an allocation block selector 32. FIG. 19 is a flowchart for illustrating an allocation block selection process of the allocation block selector 32. The configuration of the NAND controller 11 other than the allocation block selector 32 is the same as that of the first embodiment.

The allocation block selector 32 has three selectors 32A to 32C and a storage unit 32D that stores an allocation block setting value. The allocation block selector 32 receives entire block information from the block controller 30 (step S90). The entire block information is supplied to the selector 32A. Then, the selector 32A confirms the states of all of the blocks and extracts blocks set in the free state from all of the blocks (step S91). After this, the selector 32A supplies block information (free state block information) corresponding to the blocks set in the free state to the selector 32B.

Next, the selector 32B extracts block information with conditions set by the allocation block setting value from the free state block information (step S92). As the allocation block setting value, one of the following conditions is set.

(A) A preset number of blocks starting from the block with the oldest erase time (B) A preset ratio of blocks starting from the block with the oldest erase time (C) Blocks whose erase time is older than preset time One of the conditions (A) to (C) is used as the allocation block setting value can be freely selected. For example, if the condition (A) is used as the allocation block setting value, the selector 32B extracts a preset number of blocks starting from the block with the oldest erase time from the blocks set in the free state. Then, the selector 32B sends block information corresponding to the extracted blocks to the selector 32C.

In the conditions (A) and (B), blocks set in the free state are sorted in an order of erase times and a preset number or a preset ratio of blocks starting from the oldest block are searched for. Therefore, since the number of blocks selected in step S92 can be increased, the probability that blocks with a smaller erase count are selected in step S93 can be enhanced. In the condition (C), since it is sufficient to sort only blocks set in the free state in which the erase time exceeds the preset time, the processing load becomes minimum. In the conditions (A) and (B), a preset number or a preset ratio of blocks starting from the block with the oldest erase time are always extracted and, in the condition (C), blocks whose erase times are separated by a preset period or longer are extracted. Therefore, in the condition (C), the erase interval can always be set longer than a preset interval, and therefore, the number of comparison candidates of the erase count can be decreased.

Next, the selector 32C selects the block of the smallest erase count from the blocks extracted by the selector 32B as an allocation block (step S93). The allocation block number corresponding to the allocation block is supplied to the block controller 30.

As described above in detail, according to the present embodiment, when the allocation block into which data supplied from the exterior is written is selected, the block whose erase time is old and whose erase count is small can be selected among the blocks set in the free state as an allocation block. Therefore, data from the exterior can be written into a block having a more preferable retention characteristic and, as a result, the service life of the NAND flash memory 10 can be extended.

Third Embodiment

The erase counts of all of the blocks contained in the NAND flash memory 10 can be made approximately uniform by performing the leveling process. However, since the erase process caused by the leveling process occurs frequently if the leveling process is excessively frequently performed, there occurs a possibility that the service life of the NAND flash memory 10 may be prevented from being extended. Therefore, in this embodiment, the number of leveling processes is limited even when the load concentration degree exceeds the leveling threshold value.

Figure 20:
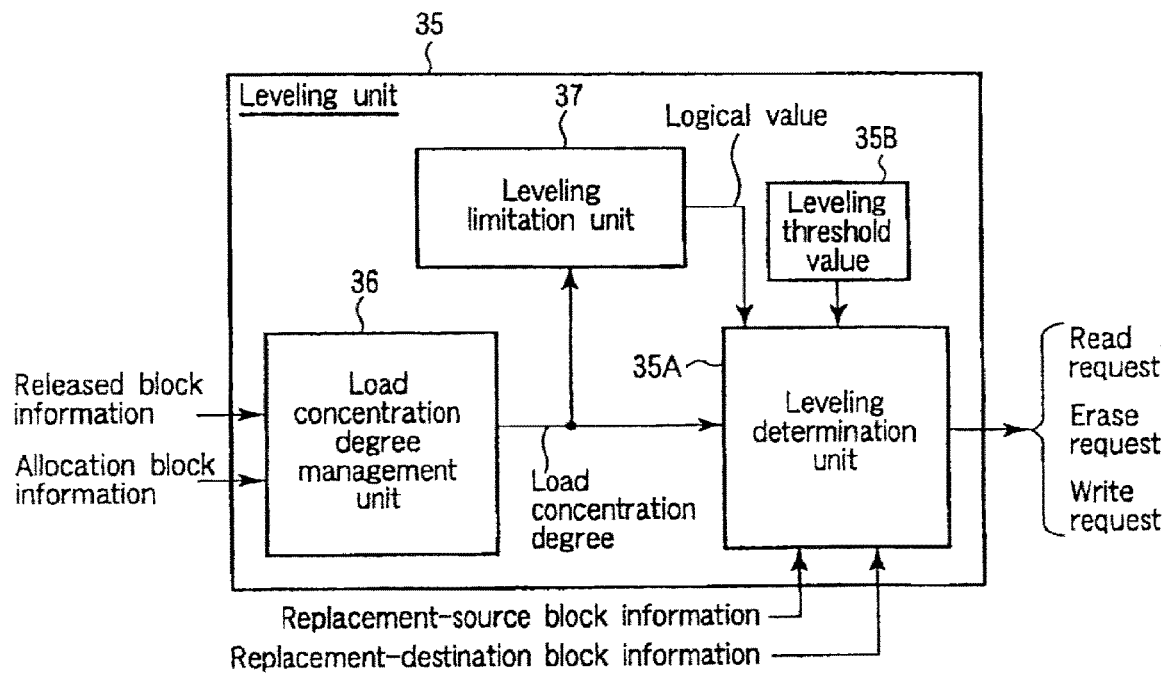
FIG. 20 is a block diagram showing the configuration of a leveling unit 35 according to a third embodiment of this invention.

FIG. 20 is a block diagram showing the configuration of a leveling unit 35 according to a third embodiment of this invention.

The leveling unit 35 includes a load concentration degree management unit 36, a leveling determination unit 35A, a storage unit 35B that stores a leveling threshold value and a leveling limitation unit 37. The configuration of the load concentration degree management unit 36 is the same as that of the first embodiment.

The leveling limitation unit 37 receives a load concentration degree from the load concentration degree management unit 36. Then, it generates a logical value used to limit the number of leveling processes based on the load concentration degree. The logical value is supplied to the leveling determination unit 35A. The leveling determination unit 35A performs a leveling process when the load concentration degree exceeds a leveling threshold value and the logical value from the leveling limitation unit 37 is true.

Figure 21:
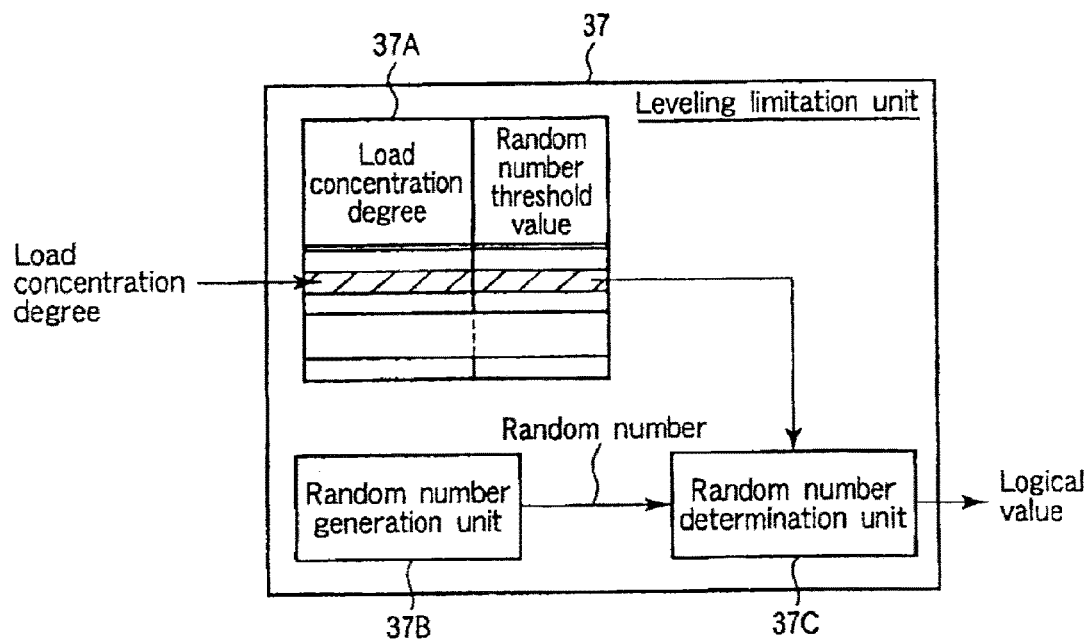
FIG. 21 is a block diagram showing the configuration of a leveling limitation unit 37.

FIG. 21 is a block diagram showing the configuration of the leveling limitation unit 37. The leveling limitation unit 37 includes a random number threshold value table 37A, random number generating unit 37B and random number determination unit 37C.

The random number threshold value table 37A shows correspondence relations between a plurality of load concentration degrees and a plurality of random number threshold values corresponding thereto. The random number threshold value table 37A sends a random number corresponding to a load concentration degree supplied from the load concentration degree management unit 36 to the random number determination unit 37C. The extent to which the number of leveling processes is limited can be freely set according to the random threshold value. For example, in an application state in which the load concentration degree is high (that is, the erase processes are successively performed at short intervals), an attempt is made not to excessively limit the number of leveling processes by setting the random threshold value large. On the other hand, in an application state in which the load concentration degree is low (that is, the erase interval is long), the number of leveling processes is limited to a large extent by setting the random threshold value small.

The random number generating unit 37B generates a random number. The random number is supplied to the random number determination unit 37C. The random number determination unit 37C determines whether or not the random number is smaller than the random number threshold value. Then, the random number determination unit 37C generates a true logical value when the random number is smaller than the random number threshold value and generates a false logical value when the random number is larger than or equal to the random number threshold value. The logical value is supplied to the leveling determination unit 35A.

Next, the leveling process of the NAND controller 11 with the above configuration is explained. FIG. 22 is a flowchart for illustrating the leveling process of the NAND controller 11.

First, the leveling determination unit 35A determines whether or not the load concentration degree supplied from the load concentration degree management unit 36 exceeds the leveling threshold value (step S60). If it is determined that the leveling threshold value is exceeded, the leveling limitation unit 37 performs a random number determination process (step S100).

FIG. 23 is a flowchart for illustrating the random number determination process of the leveling limitation unit 37. First, the random number generating unit 37B generates a random number (step S101). Then, the leveling limitation unit 37 calculates a random number threshold value corresponding to the load concentration degree supplied from the load concentration degree management unit 36 by using the random number threshold value table 37A (step S102).

Next, the random number determination unit 37C determines whether or not the random number is smaller than the random number threshold value (step S103). Then, the random number determination unit 37C outputs a true logical value when the random number is smaller than the random number threshold value (step S104). On the other hand, the random number determination unit 37C outputs a false logical value when the random number is larger than or equal to the random number threshold value (step S105).

Referring to FIG. 22 again, the leveling determination unit 35A determines the logical value output from the random number determination unit 37C (step S106). Then, the leveling determination unit 35A performs a leveling process (steps S61 to S67 shown in the first embodiment) when the logical value is true. Further, the leveling determination unit 35A interrupts the leveling process when the logical value is false.

As described above, according to the present embodiment, the number of leveling processes can be limited even when the load concentration degree exceeds the leveling threshold value. Thus, since the number of erase processes caused by leveling processes can be prevented from being increased, the service life of the NAND flash memory 10 can be extended.

Further, the erase counts of all of the blocks contained in the NAND flash memory 10 can be made substantially uniform and the number of leveling processes can be set to an optimum value.

Fourth Embodiment

A fourth embodiment of this invention is different from the first embodiment in the method of determining whether the leveling process is performed or not and shows an example in which the leveling process is performed when a difference between the erase count of the replacement-source block and the erase count of the replacement-destination block exceeds a leveling threshold value.

Figure 24:
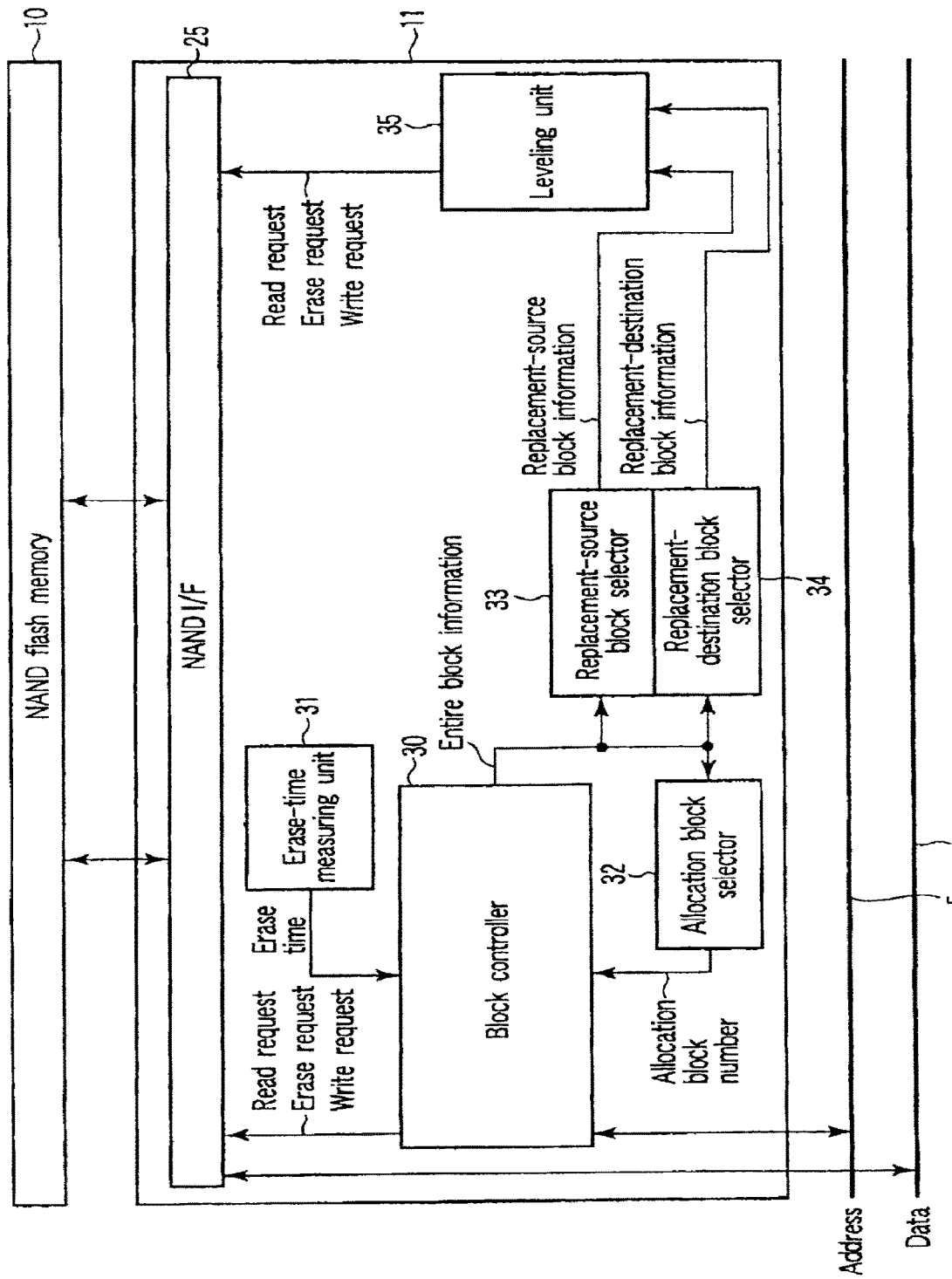
FIG. 24 is a block diagram showing the configuration of a NAND controller 11 according to a fourth embodiment of this invention.

FIG. 24 is a block diagram showing the configuration of a NAND controller 11 according to the fourth embodiment of this invention. Basically, the NAND controller 11 is the same as that shown in FIG. 4 in the first embodiment. The NAND controller 11 is different from that of the first embodiment in the internal portion of the leveling unit 35 and in that released block information and allocation block information supplied from the block controller 30 to the leveling unit 35 are omitted (not used).

FIG. 25 is a block diagram showing the configuration of the leveling unit 35. The leveling unit 35 includes a leveling determination unit 35A and a storage unit 35B that stores a leveling threshold value. The leveling determination unit 35A receives replacement-source block information supplied from a replacement-source block selector 33 and replacement-destination block information supplied from a replacement-destination block selector 34. Then, the leveling determination unit 35A calculates a difference between the erase count contained in the replacement-source block information and the erase count contained in the replacement-destination block information and determines whether or not the leveling process is performed at the present write operation time by use of the above difference and the leveling threshold value. If the leveling process is performed, the leveling determination unit 35A issues a read request, erase request and write request to the NAND interface circuit 25.

FIG. 26 is a flowchart for illustrating the leveling process of the NAND controller 11. First, the replacement-source block selector 33 performs a replacement-source block selection process (step S110). Information (replacement-source block information) of the replacement-source block selected by the replacement-source block selection process is supplied to the leveling determination unit 35A. Then, the replacement-destination block selector 34 performs a replacement-destination block selection process (step S111). Information (replacement-destination block information) of the replacement-destination block selected by the replacement-destination block selection process is supplied to the leveling determination unit 35A. In this case, the replacement-source block selection process and replacement-destination block selection process are the same as those of the first embodiment.

Next, the leveling determination unit 35A calculates a difference between the erase count contained in the replacement-source block information and the erase count contained in the replacement-destination block information (step S112). Then, the leveling determination unit 35A determines whether or not the calculated difference exceeds a leveling threshold value (step S113). The leveling threshold value is used to determine whether or not the leveling process is performed and is set based on a criterion for the extent to which the service life (or data retention period) of the NAND flash memory 10 is extended.

If it is determined that the leveling threshold value is exceeded, the block controller 30 performs a block release process of releasing the replacement-source block selected by the replacement-source block selector 33 (step S63). The block release process is the same as that of the first embodiment. After this, like the case of FIG. 13 of the first embodiment, the NAND controller 11 performs the operation of steps S64 to S67.

If it is determined in step S113 that the leveling threshold value is not exceeded, the leveling unit 35 interrupts the leveling process.

As described above, according to the present embodiment, imbalance in the erase count between the blocks can be detected and the imbalance can be corrected by performing the leveling process. Thus, since the erase counts of the blocks can be made approximately equal to one another, the service life of the NAND flash memory 10 can be extended.

The leveling limitation unit 37 shown in the third embodiment can be applied to the fourth embodiment.

Embodiment

An embodiment obtained by configuring the memory system 1 of each of the above embodiments as a solid-state drive (SSD) is explained. FIG. 27 is a block diagram showing the configuration of an SSD 100.

The SSD 100 includes a plurality of NAND flash memories (NAND memories) 10 for data storage, a DRAM 101 for data transfer or for a working area, a drive control circuit 102 that controls the above units and a power source circuit 103. The drive control circuit 102 outputs a control signal to control a status display LED provided outside the SSD 100.

The SSD 100 transfers data with respect to a host device such as a personal computer via an ATA interface (ATA I/F). Further, the SSD 100 transfers data with respect to a debug device via an RS232C interface (RS232C I/F).

The power source circuit 103 is supplied with external power source voltage and generates a plurality of internal power source voltages by use of the external power source voltage. The internal power source voltages are supplied to the respective units of the SSD 100. Further, the power source circuit 103 detects a rise or fall of the external power source voltage and generates a power-on reset signal or power-off reset signal. The power-on reset signal and power-off reset signal are supplied to the drive control circuit 102.

Figure 28:
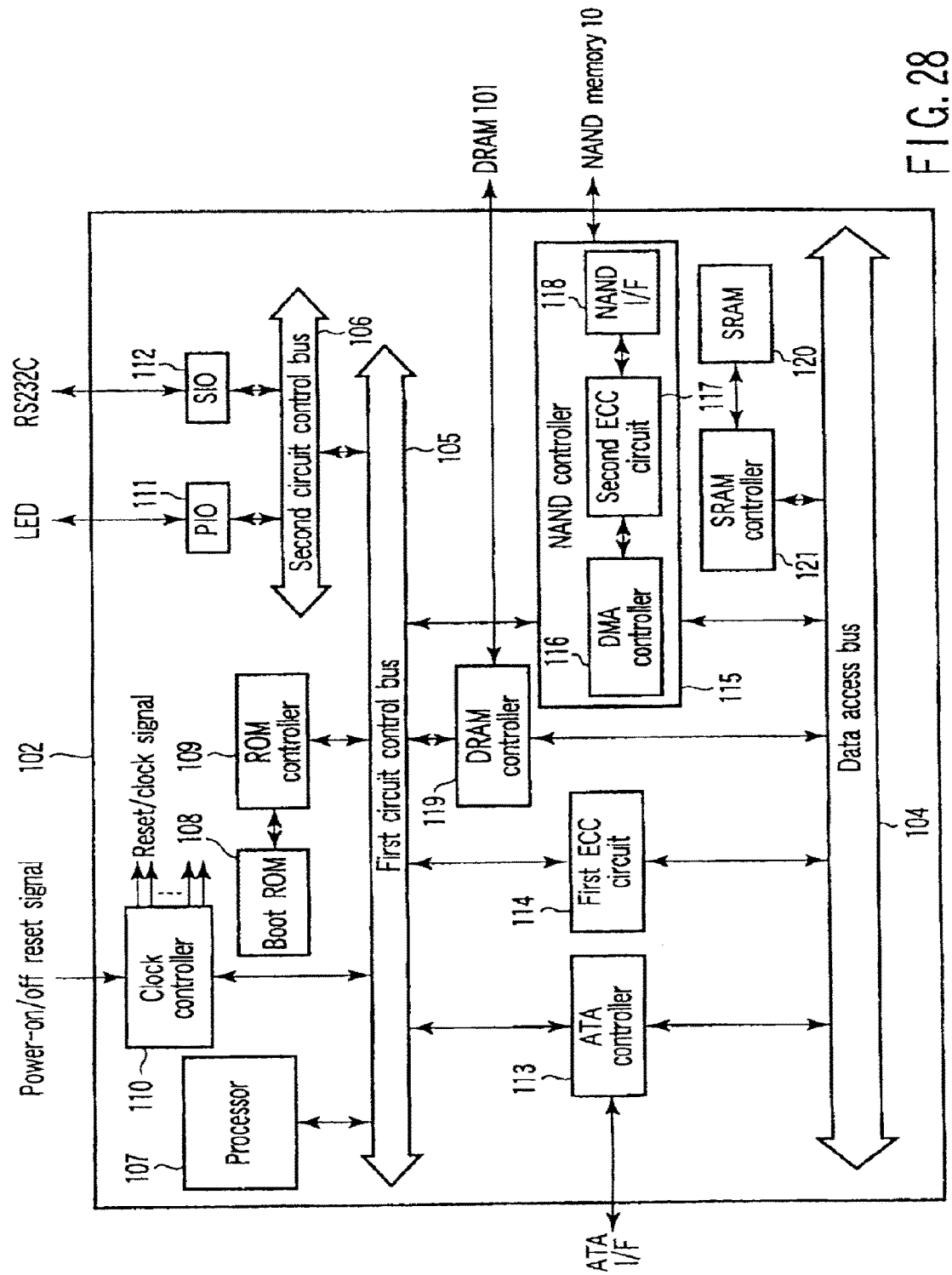
FIG. 28 is a block diagram showing the configuration of a drive control circuit 102.

FIG. 28 is a block diagram showing the configuration of the drive control circuit 102. The drive control circuit 102 includes a data access bus 104, first circuit control bus 105 and second circuit control bus 106.

A processor 107 that controls the whole portion of the drive control circuit 102 is connected to the first circuit control bus 105. Further, a boot ROM 108 in which boot programs of management programs (FW: firmwares) are stored is connected to the first circuit control bus 105 via a ROM controller 109. Also, a clock controller 109 that receives a power-on/off reset signal from the power source circuit 103 and supplies a reset signal and clock signal to the respective units is connected to the first circuit control bus 105.

The second circuit control bus 106 is connected to the first circuit control bus 105. A parallel IO (PIO) circuit 111 that supplies a status display signal to the status display LED and a serial JO (SIO) circuit 112 that controls the RS232C interface are connected to the second circuit control bus 106.

An ATA interface controller (ATA controller) 113, first error check and correction (ECC) circuit 114, NAND controller 115 and DRAM controller 119 are connected to both of the data access bus 104 and first circuit control bus 105. The ATA controller 113 transfers data with respect to the host device via the ATA interface. An SRAM 120 used as a data work area is connected to the data access bus 104 via an SRAM controller 121.

The NAND controller 115 includes a NAND I/F 118 that performs an interface process with respect to the four NAND memories 10, a second ECC circuit 117 and a DMA transfer controlling DMA controller 116 that performs access control between the NAND memory and DRAM.

FIG. 29 is a block diagram showing the configuration of the processor 107. The processor 107 includes a data management unit 122, ATA command processing unit 123, security management unit 124, boot loader 125, initialization management unit 126 and debug support unit 127.

The data management unit 122 controls various functions associated with a NAND chip and data transfer between the NAND memory and DRAM via the NAND controller 115 and first ECC circuit 114.

The ATA command processing unit 123 performs a data transfer process in cooperation with the data management unit 122 via the ATA controller 113 and DRAM controller 119. The security management unit 124 manages various security information items in cooperation with the data management unit 122 and ATA command processing unit 123. The boot loader 125 loads various management programs (FW) from the NAND memory 10 into the SRAM 120 at the power-on time.

The initialization management unit 126 initializes the various controllers/circuits in the drive control circuit 102. The debug support unit 127 processes debug data supplied from the exterior via the RS232C interface.

FIG. 30 is a perspective view showing one example of a portable computer 200 having the SSD 100 mounted thereon. The portable computer 200 has a main body 201 and display unit 202. The display unit 202 includes a display housing 203 and a display device 204 accommodated in the display housing 203.

The main body 201 includes a casing 205, a keyboard 206 and a touch pad 207 used as a pointing device. In the casing 205, a main circuit board, optical disk device (ODD) unit, card slot, SSD 100 and the like are accommodated.

The card slot is provided adjacent to the peripheral wall of the casing 205. In the peripheral wall, an opening 208 facing the card slot is formed. The user can removably insert an additional device into the card slot from the exterior of the casing 205 via the opening 208.

The SSD 100 can be mounted on the internal portion of the portable computer 200 and used instead of the conventional HDD or inserted into the card slot of the portable computer 200 and used as an additional device.

FIG. 31 shows an example of a system configuration of a portable computer 200 using an SSD 100. The portable computer 200 comprises a CPU 301, a north bridge 302, a main memory 303, a video controller 304, an audio controller 305, a south bridge 306, a BIOS-ROM 307, an SSD 100, an ODD unit 308, an embedded controller/keyboard controller IC (EC/KBC) 309, a network controller 310, etc.

The CPU 301 is a processor used for controlling the operation of the portable computer 200, and executes the operating system (OS) loaded in the main memory 303 from the SSD 100. When the ODD unit 308 enables at least one of read processing and write processing to be executed for the loaded optical disk, CPU 301 executes the processing.

The CPU 301 also executes the system BIOS (Basic Input Output System) stored in the BIOS-ROM 307. The system BIOS is a program used for controlling the hardware components of the portable computer 200.

The north bridge 302 is a bridge device for connecting the local bus of CPU 301 and the south bridge 306. The north bridge 302 incorporates a memory controller used for controlling the access to the main memory 303.

The north bridge 302 has a function of executing communications with the video controller 304 and the audio controller 305 by way of an AGP bus (Accelerated Graphics Port Bus).

The main memory 303 temporarily stores programs and data and functions as a work area of CPU 301. The main memory 303 is made of a DRAM, for example.

The video controller 304 is a video reproduction controller used for controlling a display unit (LCD) 202. The display unit 202 is used as a display monitor of the portable computer 200.

The audio controller 305 is an audio reproduction controller used for controlling the speaker 311 of the portable computer 200.

The south bridge 306 controls the devices on an LPC (Low Pin Count) bus and the devices on a PCI (Peripheral Component Interconnect) bus. The south bridge 306 also controls the SSD 100 through an ATA interface. The SSD 100 is a storage unit used for storing various kinds of software and data.

The portable computer 200 accesses the SSD 100 in units of sectors. A write command, a read command, a flash command, etc. are supplied to the SSD 100 through the ATA interface.

The south bridge 306 has a function of controlling the access to the BIOS-ROM 307 and the ODD unit 308.

The EC/KBC 309 is a 1-chip microcomputer in which an embedded controller for performing power management and a keyboard controller for controlling a keyboard (KB) 206 and a touch pad 207 are embedded.

The EC/KBC 309 has a function of turning on or off the portable computer 200 in accordance with the user's operation of a power button 312. The network controller 310 is a communication unit that performs communications with an external network, such as the Internet.

The memory system 1 of the above embodiments is not limited to the SSD and can be configured as a memory card that is represented by an SD (trademark) card. When the memory system 1 is configured as a memory card, it can be applied to not only the portable computer but also other various electronic devices such as a portable telephone, PDS, digital still camera and digital video camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
   a nonvolatile semiconductor memory comprising a plurality of blocks, each of the blocks being a unit for erasure of data; and
   a controller comprising:
   a host interface circuit to receive a command from a host;
   a memory interface circuit to interface with the nonvolatile semiconductor memory; and
   a management circuit to manage management information for each of the blocks, the management information including first information indicating an erase count, and second information indicating whether a block stores valid data;
   wherein the controller is configured to perform a first mode and a second mode,
   wherein in the first mode,
   the host interface circuit receives a write command from the host,
   the controller selects, from blocks which do not store valid data, a first block whose erase count is less than a first number, based on the management information,
   the controller writes first data into the first block via the memory interface, based on the write command, and
   the controller changes the management information to indicate the first block stores valid data:
   wherein in the second mode,
   the controller selects a second block whose erase count is a second number and which stores second data that is valid, based on the management information,
   the controller selects a third block whose erase count is a third number larger than the second number and which does not store valid data, based on the management information,
   the controller writes the second data into the third block, and
   the controller changes the management information to indicate the second block does not store valid data and the third block stores valid data.

2. The memory system according to claim 1, wherein the controller selects the first block whose erase count is minimum among the blocks which do not store valid data.

3. The memory system according to claim 2, wherein management information is registered with an erase time of the block.

4. The memory system according to claim 3, wherein the controller selects the first block from a first ratio of the blocks among the blocks whose erase time is oldest.

5. The memory system according to claim 3, wherein the controller selects the first block from the blocks whose erase time is older than a first threshold.

6. The memory system according to claim 1, wherein the controller is configured to perform the second mode when the difference between the second number and the third number is larger than a fourth number.

7. The memory system according to claim 6, wherein the management information is registered with an erase time of the block.

8. The memory system according to claim 7, wherein the controller selects the second block and the third block from a second ratio of the blocks among the blocks whose erase time is oldest.

9. The memory system according to claim 7, wherein the controller selects the second block and the third block from the blocks whose erase time is older than a second threshold.

10. The memory system according to claim 7, wherein the controller selects the second block and the third block from a fifth number of the blocks among the blocks whose erase time is oldest.

11. A control method of a memory system including,
    a nonvolatile semiconductor memory having a plurality of blocks, each of the blocks being a unit for erasure of data, and
    a controller having a host interface circuit to receive a command from a host, and a memory interface circuit to interface with the nonvolatile semiconductor memory,
    the method comprising, using the controller to perform the steps of:
    managing management information for each of the blocks, the management information including first information indicating an erase count, and second information indicating whether a block stores valid data; and
    performing a first mode and a second mode,
    where in the first mode,
    the host interface circuit receives a write command from the host,
    the controller selects, from blocks which do not store valid data, a first block whose erase count is less than a first number, based on the management information,
    the controller writes first data into the first block via the memory interface based on the write command, and
    the controller changes the management information to indicate the first block stores valid data;
    where in the second mode,
    the controller selects a second block whose erase count is a second number and which stores second data that is valid, based on the management information,
    the controller selects a third block whose erase count is a third number larger than the second number and which does not store valid data, based on the management information;
    the controller writes the second data into the third block, and
    the controller changes the management information to indicate the second block does not store valid data and the third block stores valid data.

12. The method according to claim 11, wherein the controller selects the first block whose erase count is minimum among the blocks which do not store valid data.

13. The method according to claim 12, wherein the management information is registered with an erase time of the block.

14. The method according to claim 13, wherein the controller selects the first block from a first ratio of the blocks among the blocks whose erase time is oldest.

15. The method according to claim 13, wherein the controller selects the first block from the blocks whose erase time is older than a first threshold.

16. The method according to claim 11, wherein the controller performs the second mode when the difference between the second number and the third number is larger than a fourth number.

17. The method according to claim 16, wherein the management information is registered with an erase time of the block.

18. The method according to claim 17, wherein the controller selects the second block and the third block from a second ratio of the blocks among the blocks whose erase time is oldest.

19. The method according to claim 17, wherein the controller selects the second block and the third block from the blocks whose erase time is older than a second threshold.

20. The method according to claim 17, wherein the controller selects the second block and the third block from a fifth number of the blocks among the blocks whose erase time is oldest.

* * * * *